United States Patent
Levien et al.

(10) Patent No.: US 8,863,275 B2
(45) Date of Patent: *Oct. 14, 2014

(54) ACCESS RESTRICTION IN RESPONSE TO DETERMINING DEVICE TRANSFER

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/065,885

(22) Filed: Mar. 30, 2011

(65) Prior Publication Data

US 2012/0254991 A1    Oct. 4, 2012

(51) Int. Cl.
G06F 21/00 (2013.01)
G06F 21/35 (2013.01)

(52) U.S. Cl.
CPC ..................... G06F 21/35 (2013.01)
USPC ............... 726/21; 713/166; 713/186; 726/2; 726/16; 726/27

(58) Field of Classification Search
None
See application file for complete search history.

(56) References Cited

U.S. PATENT DOCUMENTS

| | | | |
|---|---|---|---|
| 5,875,257 A * | 2/1999 | Marrin et al. | 382/107 |
| 6,002,427 A | 12/1999 | Kipust | |
| 6,128,003 A * | 10/2000 | Smith et al. | 345/157 |
| 6,961,912 B2 | 11/2005 | Aoki et al. | |
| 7,190,351 B1 | 3/2007 | Goren | |
| 7,200,248 B2 | 4/2007 | Horiguchi | |
| 7,260,726 B1 | 8/2007 | Doe et al. | |
| 7,437,765 B2 | 10/2008 | Elms et al. | |
| 7,649,444 B1 | 1/2010 | Fear et al. | |
| 7,774,486 B2 | 8/2010 | Clarke | |
| 7,868,778 B2 | 1/2011 | Kenwright | |
| 8,279,242 B2 | 10/2012 | Bentley | |
| 8,289,130 B2 * | 10/2012 | Nakajima et al. | 340/5.3 |
| 8,406,162 B2 | 3/2013 | Haupt et al. | |
| 8,479,122 B2 * | 7/2013 | Hotelling et al. | 715/863 |
| 2002/0126876 A1 * | 9/2002 | Paul et al. | 382/104 |
| 2002/0176603 A1 * | 11/2002 | Bauer et al. | 382/103 |
| 2003/0016253 A1 | 1/2003 | Aoki et al. | |
| 2003/0107584 A1 | 6/2003 | Clapper | |
| 2005/0039027 A1 | 2/2005 | Shapiro | |
| 2005/0149726 A1 | 7/2005 | Joshi et al. | |
| 2006/0052132 A1 | 3/2006 | Naukkarinen et al. | |

(Continued)

OTHER PUBLICATIONS

Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unl_ock_customize_interact_with_ios_devices.html.

(Continued)

*Primary Examiner* — Jung Kim
*Assistant Examiner* — James J Wilcox

(57) ABSTRACT

A computationally implemented method includes, but is not limited to: determining that a computing device used by a first user has been transferred from the first user to a second user; and restricting access via the computing device to one or more items in response to said determining. In addition to the foregoing, other method aspects are described in the claims, drawings, and text forming a part of the present disclosure.

49 Claims, 21 Drawing Sheets

(56) References Cited

U.S. PATENT DOCUMENTS

| | | |
|---|---|---|
| 2006/0277474 A1 | 12/2006 | Robarts et al. |
| 2007/0005616 A1 | 1/2007 | Hay et al. |
| 2007/0030824 A1 | 2/2007 | Ribaudo et al. |
| 2007/0052672 A1 | 3/2007 | Ritter et al. |
| 2007/0150827 A1 | 6/2007 | Singh et al. |
| 2007/0162574 A1 | 7/2007 | Williamson et al. |
| 2007/0174633 A1 | 7/2007 | Draper et al. |
| 2007/0234209 A1 | 10/2007 | Williams |
| 2007/0247425 A1 | 10/2007 | Liberty et al. |
| 2008/0159496 A1 | 7/2008 | Brown |
| 2008/0201783 A1 | 8/2008 | Tamai |
| 2008/0233996 A1 | 9/2008 | Ogasawara et al. |
| 2008/0266089 A1 | 10/2008 | Haren et al. |
| 2008/0271109 A1 | 10/2008 | Singh et al. |
| 2009/0005079 A1 | 1/2009 | Shields et al. |
| 2009/0006962 A1 | 1/2009 | Ives et al. |
| 2009/0015425 A1 | 1/2009 | Palmqvist et al. |
| 2009/0179765 A1 | 7/2009 | Nymark et al. |
| 2009/0210932 A1 | 8/2009 | Balakrishnan et al. |
| 2009/0239587 A1 | 9/2009 | Negron et al. |
| 2009/0240569 A1 | 9/2009 | Ramer et al. |
| 2009/0253410 A1* | 10/2009 | Fitzgerald et al. ............ 455/411 |
| 2009/0292930 A1 | 11/2009 | Marano et al. |
| 2009/0297064 A1 | 12/2009 | Koziol et al. |
| 2010/0053322 A1 | 3/2010 | Marti et al. |
| 2010/0124363 A1 | 5/2010 | Ek et al. |
| 2010/0157135 A1 | 6/2010 | Dossaji et al. |
| 2010/0167783 A1 | 7/2010 | Alameh et al. |
| 2010/0180210 A1 | 7/2010 | Toyama et al. |
| 2010/0222141 A1 | 9/2010 | LaSalvia et al. |
| 2010/0235667 A1* | 9/2010 | Mucignat et al. ............ 713/323 |
| 2010/0275159 A1* | 10/2010 | Matsubara et al. ............ 715/810 |
| 2011/0025842 A1 | 2/2011 | King et al. |
| 2011/0069940 A1 | 3/2011 | Shimy et al. |
| 2011/0072452 A1 | 3/2011 | Shimy et al. |
| 2011/0083109 A1 | 4/2011 | Hildebrandt et al. |
| 2011/0093806 A1 | 4/2011 | Cohen et al. |
| 2011/0107427 A1 | 5/2011 | Cohen et al. |
| 2011/0110557 A1 | 5/2011 | Clark et al. |
| 2011/0133908 A1 | 6/2011 | Leung |
| 2011/0141011 A1 | 6/2011 | Lashina et al. |
| 2011/0154266 A1 | 6/2011 | Friend et al. |
| 2011/0166972 A1 | 7/2011 | Cohen et al. |
| 2011/0197121 A1 | 8/2011 | Kletter |
| 2011/0202269 A1 | 8/2011 | Reventlow |
| 2011/0227856 A1 | 9/2011 | Corroy et al. |
| 2011/0231911 A1 | 9/2011 | White et al. |
| 2011/0265179 A1 | 10/2011 | Newman et al. |
| 2011/0317872 A1 | 12/2011 | Free |
| 2011/0321143 A1 | 12/2011 | Angaluri et al. |
| 2012/0017147 A1 | 1/2012 | Mark |
| 2012/0028625 A1 | 2/2012 | Konig |
| 2012/0062729 A1 | 3/2012 | Hart et al. |
| 2012/0081392 A1* | 4/2012 | Arthur ............ 345/633 |
| 2012/0088543 A1 | 4/2012 | Lindner et al. |
| 2012/0108215 A1 | 5/2012 | Kameli |
| 2012/0131471 A1 | 5/2012 | Terlouw et al. |
| 2012/0151339 A1 | 6/2012 | Zhang et al. |
| 2012/0166966 A1 | 6/2012 | Wood et al. |
| 2012/0191764 A1 | 7/2012 | Leibu et al. |
| 2012/0235790 A1* | 9/2012 | Zhao et al. ............ 340/5.83 |
| 2012/0256967 A1 | 10/2012 | Baldwin et al. |
| 2012/0293528 A1 | 11/2012 | Larsen |
| 2012/0311438 A1 | 12/2012 | Cranfill et al. |
| 2012/0330660 A1 | 12/2012 | Jaiswal |
| 2013/0065608 A1 | 3/2013 | Nakajima et al. |
| 2013/0159939 A1 | 6/2013 | Krishnamurthi |

OTHER PUBLICATIONS

U.S. Appl. No. 13/374,479, Levien et al.
U.S. Appl. No. 13/374,352, Levien et al.
U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
"Computer Detecting User Presence Video Mockup [Ubuntu]"; Web Upd8.org; Bearing a date of Sep. 14, 2010; pp. 1-11; located at: http://www.webupd8.org/2010/09/computer-detecting-user-presence-video.html; printed on Mar. 30, 2011.
"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.
Pike, John; "Homeland Security: Biometrics"; GlobalSecurity.org; Bearing a date of Mar. 9, 2007; 4 Total pages; located at: http://www.globalsecurity.org/security/systems/biometrics.htm.
Kernchen et al.; "Multimodal user interfaces for context-aware mobile applications"; IEEE 16th International Symposium on Personal, Indoor and Mobile Radio Communications; bearing a date of Mar. 20, 2005; pp. 2268-2273; #1568961325; IEEE.
Noll et al.; "Integrating Mobile Devices into Semantic Services Environments"; The Fourth International Conference on Wireless and Mobile Communications; bearing a date of Mar. 4, 2008; pp. 137-143; IEEE Computer Society.

\* cited by examiner

**102\* Transfer Determining Module**

210 Particular Movement Determining Module

- 212 Tilt Detecting Module
- 214 Spatial Location Detecting Module
- 216 Rotation Detecting Module
- 217 Moving Away Detecting Module
- 218 Vibration Detecting Module
- 219 3-Dimensional Movement Detecting Module

220 Visual Cue Detecting Module

- 221 Lighting Change Detecting Module
- 222 Face Detecting Module
- 223 Eyeball Detecting Module
- 224 Visual Moving Away Detecting Module

226 Audio Cue Detecting Module

- 227 Voice Pattern Detecting Module
- 228 Audio Moving Away Detecting Module

230 Geographic Location Determination Module

FIG. 2c

ACCESS RESTRICTION IN RESPONSE TO DETERMINING DEVICE TRANSFER

SUMMARY

A computationally implemented method includes, but is not limited to determining that a computing device used by a first user has been transferred from the first user to a second user; and restricting access via the computing device to one or more items in response to said determining. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein- referenced method aspects depending upon the design choices of the system designer.

A computationally implemented system includes, but is not limited to: means for determining that a computing device used by a first user has been transferred from the first user to a second user; and means for restricting access via the computing device to one or more items in response to said determining. In addition to the foregoing, other system aspects are described in the claims, drawings, and text forming a part of the present disclosure.

A computationally implemented system includes, but is not limited to: circuitry for determining that a computing device used by a first user has been transferred from the first user to a second user; and circuitry for restricting access via the computing device to one or more items in response to said determining. In addition to the foregoing, other system aspects are described in the claims, drawings, and text forming a part of the present disclosure.

A computer program product comprising an article of manufacture bearing one or more instructions for determining that a computing device used by a first user has been transferred from the first user to a second user; and one or more instructions for restricting access via the computing device to one or more items in response to said determining. In addition to the foregoing, other computer program product aspects are described in the claims, drawings, and text forming a part of the present disclosure.

A method for restricting access to one or more items through a computing device, the method includes determining that a computing device used by a first user has been transferred from the first user to a second user, wherein said determining that a computing device used by a first user has been transferred from the first user to a second user is performed via at least one of a machine, article of manufacture, or composition of matter; and restricting access via the computing device to one or more items in response to said determining.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2c shows another perspective of the transfer determining module 102* of FIGS. 2a and 2b.

DETAILED DESCRIPTION

Figure 1:
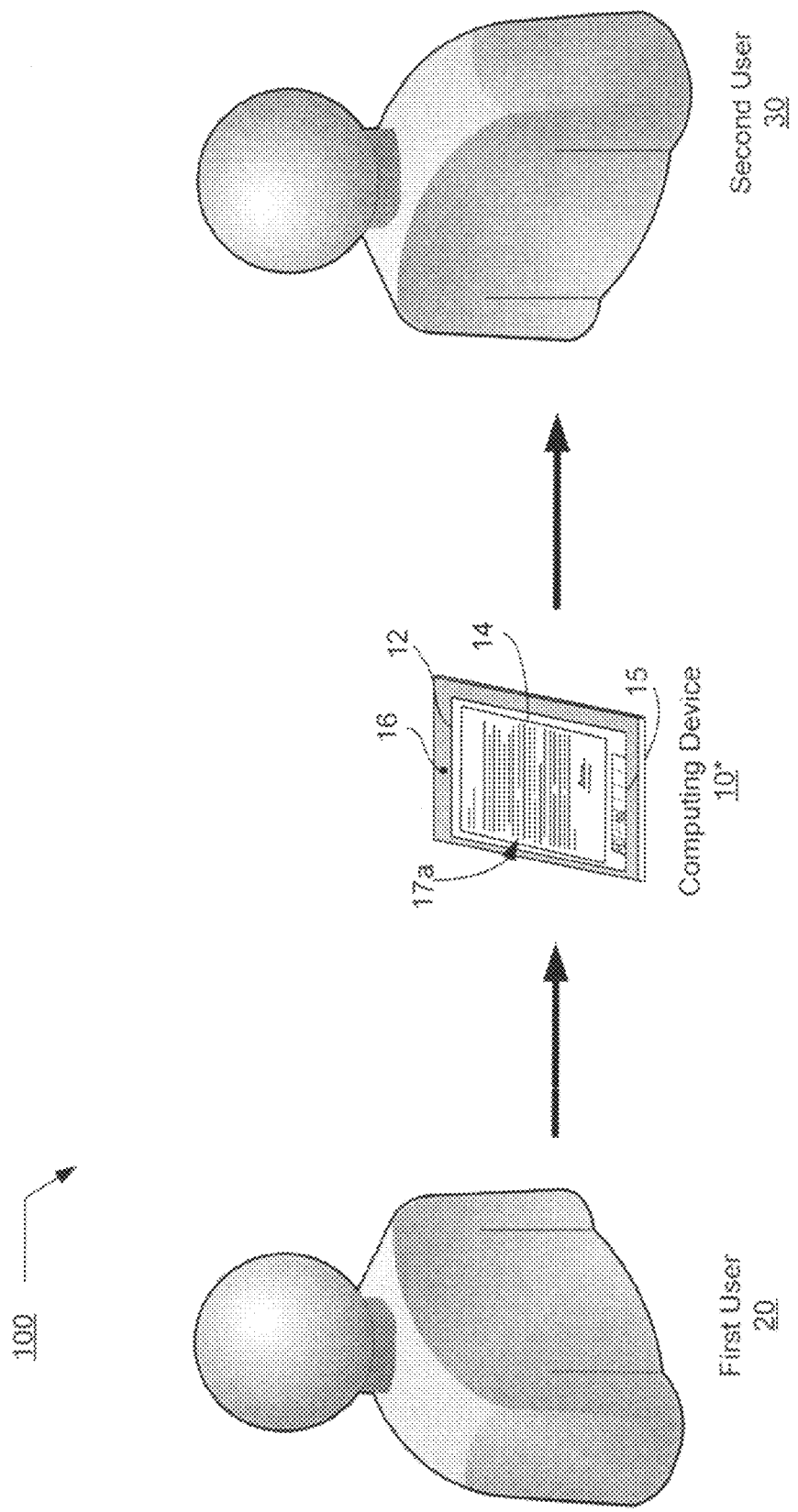
FIGS. 1 shows a computing device 10* being transferred between two users in an exemplary environment 100.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have resulted in the development of computing devices with tremendous processing power while having relatively small form factors. Examples of such computing devices include, for example, laptops, Netbooks, tablet computers (i.e., "slate" computers), e-readers, Smartphones, and so forth. Because of their compactness, such devices are becoming much easier to share among a plurality of users. That is, because of their small form factors, such devices allow owners of such devices to easily pass or handoff their devices for others to use/access. For example, suppose a primary user (e.g., an owner) of a tablet computer, wants to show some content that is being displayed through his/her tablet computer to a friend sitting across a table from the primary user. Typically, in order to show the content of what is being displayed through the tablet computer to the friend, the primary user may simply pass or handover the tablet computer to the friend thereby allowing the friend to view the content of interest.

Unfortunately by doing so, the primary user's friend, in addition to having access to the content of interest, may have access to many other things that the primary user may not want the friend to have access to. For example, upon handed the tablet computer, the friend may be able to view any confidential documents, images, applications, websites, passwords, and so forth, that may be open or running at the time that the tablet computer was handed over to the friend. Even worse, the primary user's friend may be able to not just access open applications and content, but may be able to retrieve/use/modify any content (e.g., documents, image files, audio files, etc.) or applications that may be stored in the tablet computer.

In accordance with various embodiments, computationally implemented methods, systems, and articles of manufacture are provided that can determine whether a computing device used by a first user has been transferred from the first user to a second user; and in response to determining that the computing device has been transferred from the first user to the second user, automatically reconfigure the computing device to restrict access to one or more items (e.g., documents, files, image or audio files, applications, passwords, and so forth) that may have been accessible to the first user when the first user was using the computing device. In various embodiments, such computationally implemented methods, systems, and articles of manufacture may be implemented at the computing device.

Figure 2A:
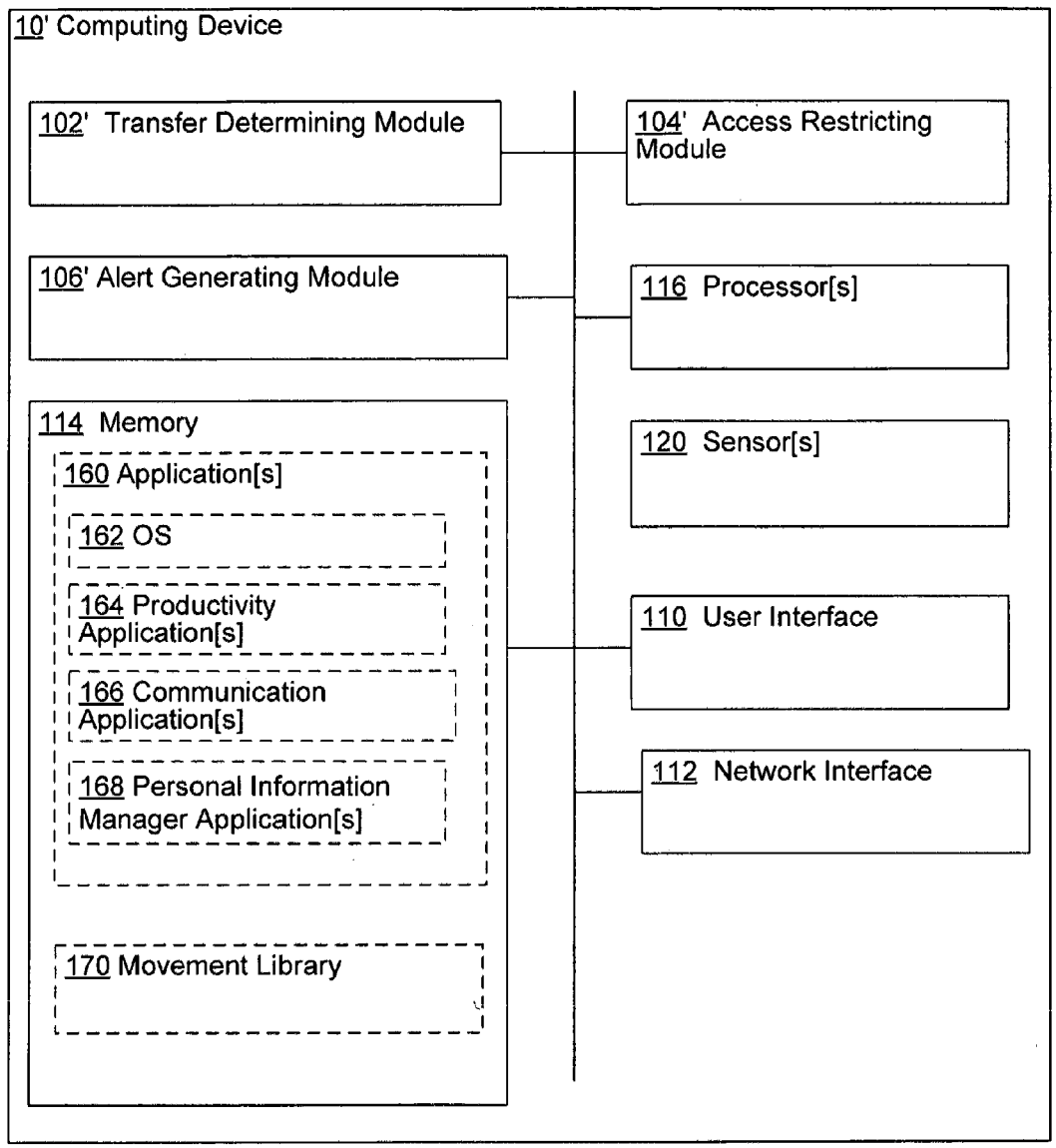
FIG. 2a shows a particular implementation of the computing device 10* of FIG. 1 illustrated as computing device 10'.
Figure 2B:
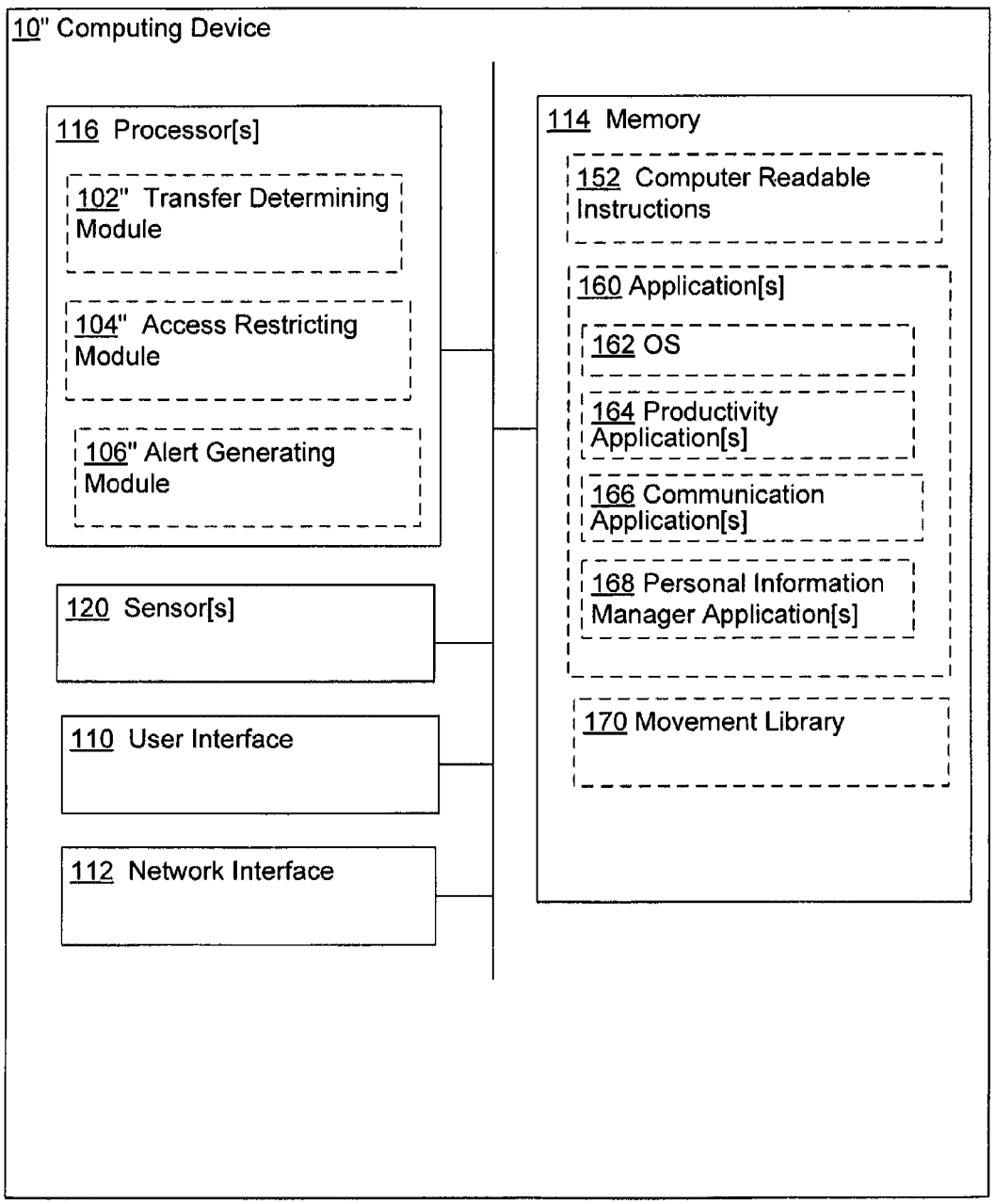
FIG. 2b shows another implementation of the computing device 10* of FIG. 1 illustrated as computing device 10".

Referring now to FIG. 1 illustrating a computing device 10* in an exemplary environment 100 being transferred between two users. As will be further described herein the illustrated computing device 10* may employ the computationally implemented methods, systems, and articles of manufacture in accordance with various embodiments. The computing device 10*, in various embodiments, may be endowed with logic that is designed to determine that the computing device 10* is being transferred (e.g., handed or passed-off) from a first user 20 to a second user 30, and in response to such a determination, automatically restrict access to one or more items (e.g., electronic documents, image or audio files, passwords, applications, and so forth) that may have been accessible to the first user 20 when the first user 20 was using the computing device 10*. In some cases, the first user 20 may be the primary user, such as the owner, of the computing device 10*, and the second user 30 may be a third party who may have inferior access rights to the computing device 10* or to items (e.g., documents, images, applications, etc.) stored in the computing device 10*. Note that FIGS. 2a and 2b illustrate two different implementations of the computing device 10* of FIG. 1 illustrated in FIG. 2a as computing device 10' and in FIG. 2b as computing device 10". Note further that for purposes of the following, "*" represents a wildcard. Thus, references in the following to the "computing device 10*" may be in reference to the computing device 10' of FIG. 2a or the computing device 10" of FIG. 2b.

Although the computing device 10* illustrated in FIG. 1 is depicted as being a tablet computer, in alternative embodiments, the computationally implemented methods, systems, and articles of manufacture in accordance with various embodiments may be embodied in other types of computer systems having other form factors including other types of portable computer devices such as, for example, laptops, Netbooks, Smartphones, e-readers, and so forth. As illustrated, the computing device 10* includes a display 12, such as a touchscreen, on the front side 17a of the computing device 10*. As further depicted in FIG. 1, the display 12 displaying an exemplary document 14 and a tool bar 15. As further depicted, the computing device 10* may also include a camera 16 (e.g., a webcam) disposed on the front side 17a of the computing device 10*. In some embodiments, additional cameras may be included on the front side 17a and/or backside 17b (see, for example, FIGS. 3a-3d) of the computing device 10*.

There are a number of ways to determine whether a computing device 10* is or has been transferred from one user to another. In some cases, for instance, various sensor-provided data may be collected in order to make such a determination. Such data may indicate various environmental aspects surrounding the computing device and/or aspects of the computing device itself (e.g., movements). For example, when the computing device 10* of FIG. 1 is passed from, for example, the first user 20 (e.g., a primary user or owner) to a second user 30, the first user 20 may exhibit certain gestures that may at least infer that the computing device 10* is being transferred from the first user 20 to another user (e.g., second user 30). Such gestures may include, for example, the first user 20 extending his/her arms out with the computing device 10* in one or both hands (e.g., as if to offer the computing device 10* to the second user 30); the first user 20 passing the computing device 10* from one hand to another hand, and extending the second hand with the computing device 10* out and away from the first user 20; the first user 20 rotating the computing device 10* around using his/her hands so that the front side 17a of the computing device 10* faces away from the first user 20 and faces the second user 30, who is standing or sitting across from the first user 20, and so forth. These movements or gestures made by the first user 20, when detected, may infer that the transfer (e.g., change in possession) of the computing device 10* from a first user 20 to a second user 20 has occurred. One way to track the movements or gestures of the first user 20 is to track the movements of the computing device 10*. That is, these gestures that may be exhibited by the first user 20 during the transfer of a computing device 10* from the first user 20 to the second user 30 may cause the computing device 10* to be spatially moved in a particular way. Thus, in order to detect whether a computing device 10* is being transferred from a first user 20 to a second user 30, one may observe the spatial movements of the computing device 10* in order to detect spatial movements that when detected at least infer the transfer of the computing device 10* between the first user 20 and the second user 30. For example, the computing device 10* may maintain in its memory 114 (see FIGS. 2a and 2b) a movement library 170 (see FIGS. 2a and 2b), which is a catalog or library that identifies those spatial movements that when detected as occurring at least infers (e.g., implies) that a transfer of the computing device 10* has occurred between two users (e.g., first user 20 and second user 30).

One way to monitor for such movements of the computing device 10* is to directly detect such movements using one or more "movement" sensors that are designed to directly detect/measure movements. Examples of such movement sensors include, for example, inertia sensors, accelerometers (e.g. three-axis or 3D accelerometers), gyroscopes, and so forth. These sensors (herein "movement" sensors 202—see FIG. 2f which illustrates the one or more types of sensors 120 that may be included in the computing device 10 of FIG. 1) when integrated with a computing device 10 may be used to directly detect the actual movements/motions of the computing device 10 as the computing device 10 is being transferred from, for example, a first user 20 to a second user 30.

Since not all movements of the computing device 10* that may be detected will be as a result of the computing device 10* being transferred between two users, in various embodiments and as will be further described herein, the computing device 10 *may be endowed with particular logic for determining (e.g., identifying) which movements associated with the computing device 10* that have been detected indicates or at least infers that the computing device 10* is or has been transferred from, for example, a first user 20 to a second user 30 and which detected movements may merely be "noise movements."

Various types of movements of the computing device 10* may be tracked in order to determine or at least infer that the computing device 10* is being transferred between, for example, a first user 20 and a second user 30. Examples of the type of movements that may be tracked include, for example, tilt type movements, spin type rotation movements, spatial relocation type movements, vibration movements, and so forth of the computing device 10. In order to determine or at least infer that the computing device 10 has been transferred from the first user 20 to the second user 30, these movements of the computing device 10 may be, individually or in combination, tracked using one or more sensors 120 that may be included with the computing device 10* as illustrated in FIG. 2f. For example, in various embodiments, one or more movement sensors 202 (e.g., inertia devices, accelerometers, etc.) that can directly detect movements, and/or other types of sensors (e.g., image capturing devices 204, audio capturing devices 206, etc.) that may be able to indirectly detect movements may be employed in order to track the movements of the computing device 10* as will be further described herein.

Figure 3A:
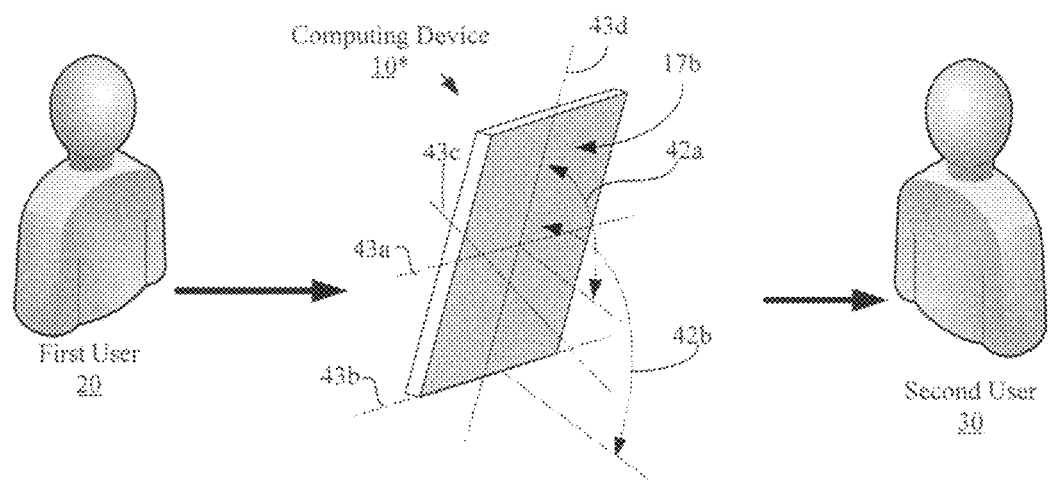
FIG. 3a shows one type of movement that may be detected/monitored by the computing device 10* of FIGS. 2a and 2b.

Referring now to FIG. 3a illustrating various types of tilts and tilt movements of the computing device 10 that may be detected and monitored using one or more sensors 120 (e.g., one or more movement sensors 202) in order to, for example, determine or infer that the computing device 10* has been transferred from a first user 20 to a second user 30. That is, FIG. 3a shows the backside 17b of the computing device 10* and some of the tilt-type movements that may be monitored by the computing device 10* in order to, for example, determine whether the computing device 10* has been transferred from a first user 20, such as a primary user or owner of the computing device 10*, to a second user 30, such as a third party (e.g., a friend or co-worker) who may have at least a lower access rights to the computing device 10 than the first user 20. One type of tilt that may be detected/monitored is tilt 42a of the computing device 10* that may occur when the computing device 10* is at least partially rotated around a central horizontal axis 43a. A second type of tilt that may be detected is tilt 42b, which may occur when the computing device 10* is at least partially rotated around a bottom horizontal axis 43b. Although not depicted, another type of tilt that may occur and that may be monitored is when the computing device 10* is at least partially rotated around an angular axis 43c that is angular with respect to a horizontal axis (e.g., axis 43a or 43b) and is parallel to the plane of the backside 17b similar to axis 43a and axis 43b. Yet another type of tilt that may occur and that may also be monitored is when the computing device 10* is at least partially rotated around a vertical axis 43d. Note that although the vertical axis 43d is depicted as being centered along the backside 17b of the computing device 10*, just like the horizontal axis 43b, the vertical axis 43d does not have to be centered on the backside 17b and instead, may be offset from the center of the backside 17b of the computing device 10* (e.g., may be closer to one end of the device rather than an opposite end of the device.

By detecting that the computing device 10* has been tilted in a particular manner from a first tilt orientation to a second tilt orientation, a determination or an inference may be made that the computing device 10* has been transferred from the first user 20 to the second user 30. In particular, when the first user 20 is handing off or transferring the computing device 10* to the second user 30, the first user 20 may tilt the computing device 10* in a particular way that may be identifiable. Thus, when the computing device 10* is being transferred from a first user 20 to a second user 30, the computing device 10* (or rather the logic endowed with the computing device 10*) may track the movements of the computing device 10* as it moves from a first tilt orientation (e.g., the tilt of the computing device 10* at the beginning of the transfer or when the first user 20 was using the computing device 10*) to a second tilt orientation (e.g., the tilt of the computing device 10* at the end of the transfer or when the second user 30, for example, has obtained possession of the computing device 10*).

In order to make a determination or inference that a transfer was made from the first user 20 to the second user 30, the computing device 10* or at least the logic endowed in the computing device 10* may examine the particular movements of the computing device 10* (e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to determine or infer that the computing device 10* has been transferred. To further determine or at least infer that the computing device 10* has been transferred from the first user 20 to the second user 30, the examination/analysis of the detected tilt movements of the computing device 10* may involve comparing the detected tilt movements of the computing device 10* with catalogued or library tilt movements (which may be stored in the memory 114 of the computing device 10) that are identified as being movements associated with transfer of the computing device 10* between two users.

That is, the computing device 10* may maintain in its memory 114 (see FIGS. 2A and 2B) a movement library 170 that may include a catalogue or library of movements including tilt movements that have been previously identified as tilt movements that may occur when, for example, a computing device 10\* is transferred between two users (e.g., first user 20 and second user 30). Thus, when tilt movements that match with catalogued or library tilt movements have been detected, then a determination or inference may be made that a transfer of the computing device 10\* between two users has occurred. Note that the above discussed tilt movements relates to the movement of the computing device 10\* as it moves from a first tilt orientation to a second tilt orientation.

Thus, another aspect of tilt orientation changes that may be considered in order to determine or infer that a transfer has taken place is to simply look at the end points of the tilt reorientation and their differences. In other words, to analyze the first tilt orientation (e.g., the tilt orientation of the computing device 10\* before the computing device 10\* being reoriented) and the second tilt orientation (e.g., the end tilt orientation of the computing device 10\* after it has been reoriented) with respect to each other, and the differences between the first tilt orientation and the second tilt orientation. Thus, in some embodiments, the computing device 10\* may also or additionally maintain a catalogue or library of changes of tilt orientation (e.g., tilt orientation changes) that have been previously identified as tilt changes that occur when, for example, a computing device 10\* is transferred between two users. Such catalogue or library of tilt orientation changes may be stored as part of a movement library 170 stored in memory 114 (see FIGS. 2a and 2b) of the computing device 10\* of FIG. 1 (e.g., the computing device 10' of FIG. 2a or the computing device 10" of FIG. 2b). Therefore, when tilt orientation changes that match with catalogued or library tilt orientation changes (e.g., as stored in the movement library 170 of the memory 114) have been detected, then at least an inference may be made that a transfer of the computing device 10\* between two users has occurred.

Figure 3B:
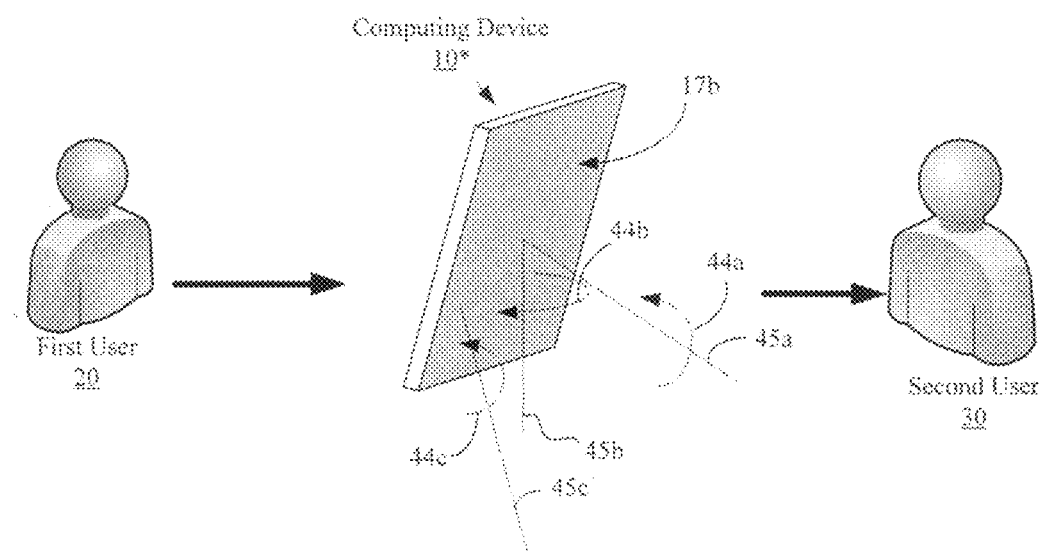
FIG. 3b shows another type of movement that may be detected/monitored by the computing device 10* of FIGS. 2a and 2b.

Referring now to FIG. 3b illustrating another type of movement of the computing device 10\* that may be detected/monitored in order to determine or infer that the computing device 10\* has been transferred between two users. In particular, FIG. 3b shows a couple types of spin rotation and spin rotation movements of the computing device 10\* that may be detected/monitored using one or more sensors 120 (e.g., one or more movement sensors 202) in order to determine or infer that the transfer of the computing device 10\* has occurred. Note that this type of rotation (e.g., spin rotation) is different from the type of rotation associated with the previously described tilt movement where the "tilt" rotation involves the entire backside 17b of the computing device 10\* rotating around some axis in a sweeping motion. In a spin rotation, the backside 17b of the computing device 10\* substantially spins around an axis without the sweeping motion. Referring back to FIG. 3b, which shows some of the various types of spin rotations that may be monitored by the computing device 10\* in order to, for example, determine whether the computing device 10\* has been transferred from a first user 20, such as a primary user or owner of the computing device 10\*, to a second user 30, such as a third party who may have inferior access rights to the computing device 10 than the first user 20. Examples of the type of spin rotations that may be monitored include a spin rotation 44a of the computing device 10\* that occurs when the computing device 10\* is rotated around a center axis 45a that is centered and vertical to the backside 17b of the computing device 10\*. Another type of rotation that may be monitored is a spin rotation 44b of the computing device 10\* that occurs when the computing device 10\* is rotated around a center axis 45b that may be centered but not vertical to the backside 17B of the computing device 10\*. Instead, the center axis 45b is angular to the backside 17b of the computing device 10\* such that when the computing device 10\* is rotating around the center axis 45b, the computing device 10\* will have a constant tilt with respect to the center axis 45b. Another type of rotation that may be monitored is spin rotation 44c of the computing device 10\* that may occur when the computing device 10\* is rotated around an axis 45c that may not be centered on the backside 17B of the computing device and that may not be vertical to the backside 17B of the computing device 10\*.

By detecting that the computing device 10\* has been spin rotated in a particular manner, a determination or an inference may be made that the computing device 10\* has been transferred from the first user 20 to the second user 30. In particular, when the first user 20 is handing off or transferring the computing device 10\* to the second user 30, the first user 20 may spin rotate the computing device 10\* in a particular way. Thus, when the computing device 10\* is being transferred from a first user 20 to a second user 30, the computing device 10\* (or rather the logic endowed with the computing device 10\*) may track the movements of the computing device 10\* as it moves from a first spin orientation (e.g., the orientation of the computing device 10\* at the beginning of the transfer or when the first user 20 was using the computing device 10\*) to a second spin orientation (e.g., the orientation of the computing device 10\* at the end of the transfer or when the second user 30 has obtained possession of the computing device 10\*).

Similar to the tilt or tilt movement detection/analysis described earlier, in order to make a determination or inference that a transfer was made from the first user 20 to the second user 30, the computing device 10\* or at least the logic endowed in the computing device 10\* may scrutinize the particular movements of the computing device 10\* as the computing device 10\* spin rotates from a first orientation to a second orientation. The computing device 10\* may additionally or alternatively analyze the second orientation (e.g., the orientation of the computing device 10\* after it has finished being spin rotated) at least with respect to the first orientation (e.g., the orientation of the computing device 10\* before it was spin rotated) in order to determine or at least infer that the computing device 10\* has been transferred. To further determine or at least infer that the computing device 10\* has been transferred from the first user 20 to the second user 30, the examination/analysis of the detected spin rotation of the computing device 10\* from the first orientation to the second orientation may involve comparing the detected spin rotation movement of the computing device 10\* with catalogued or library spin rotation movements that are identified as being associated with transfer of the computing device 10\*. That is, the computing device 10\* may maintain in its memory 114 (see FIGS. 2a and 2b) a movement library 170 that may include a catalogue or library of movements including spin rotation movements that when detected as occurring may infer that a transfer of the computing device 10\* between two users has occurred.

Figure 3C:
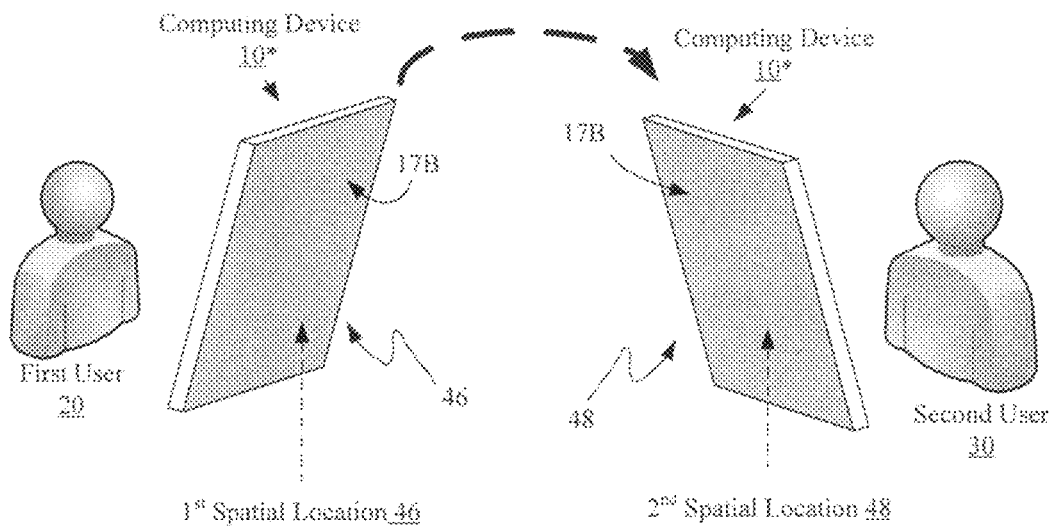
FIG. 3c shows another type of movement that may be detected/monitored by the computing device 10* of FIGS. 2a and 2b.

Turning now to FIG. 3c illustrating yet another type of movement of the computing device 10\* that may be detected/monitored in order to determine or infer that the computing device 10\* has been transferred between two users. In particular, FIG. 3c shows the computing device 10\* being relocated by moving from a first spatial location 46 to a second spatial location 48 when the computing device 10\* is transferred from a first user 20 to a second user 30. In various embodiments, such movements from the first spatial location 46 to the second spatial location 48, which will be referred to herein as "spatial relocation movements," may be detected using one or more sensors 120 (e.g., one or more movement sensors 202). In order to make a determination or inference that a transfer was made from the first user 20 to the second user 30, the computing device 10* or at least the logic endowed in the computing device 10* may examine/analyze the particular spatial relocation movements of the computing device 10 as it moves from the first spatial location 46 to the second spatial location 48, and to compare the pattern of spatial relocation movements (e.g., path, speed, acceleration, and so forth). In some cases, the computing device 10* (or rather the logic endowed with the computing device 10*) may additionally or alternatively analyze the second spatial location 48 with respect to the first spatial location 46 in order to determine or at least infer that the computing device 10* has been transferred from the first user 20 to the second user 30. To further determine or infer that the computing device 10* has been transferred from the first user 20 to the second user 30, the examination/analysis of the detected spatial relocation movements of the computing device 10* may be compared with catalogued or library spatial relocation movements that have been identified as being associated with the transfer of the computing device 10 between two users. That is, the computing device 10* may maintain in its memory 114 (see FIGS. 2a and 2b) a movement library 170 that may include a catalogue or library of movements including movements that when detected as occurring may infer that a transfer of the computing device 10* between two users has occurred.

In some embodiments, in order to determine or at least infer that the computing device 10* has been transferred from the first user 20 to the second user 30, the computing device 10* may be endowed with logic that detects/monitors vibrations. That is, each user who may come in contact with the computing device 10* may pass on to the computing device 10* unique vibration pattern or signature (e.g., as a result of heartbeat). Thus, when the first user 20 is holding the computing device 10*, the computing device 10* may vibrate in a particular vibration pattern that is associated with the first user 20. In contrast, when the computing device 10* has been transferred to the second user 30 and the second user 30 is holding the computing device 10*, the computing device 10* may vibrate in a vibration pattern that is associated with the second user 30. Thus, one way to determine whether the computing device 10* has been transferred from the first user 20 to the second user 30 is to detect/monitor at least changes in vibrations of the computing device 10*. In some cases, this may involve the computing device 10* (or at least the logic endowed with the computing device 10*) initially detecting the particular vibration pattern of the computing device 10* when the computing device 10* is being used by the first user 20, and to detect when the computing device 10* no longer vibrates in such a particular vibration pattern. In order to determine whether the computing device 10* has been transferred from the first user 20 to the second user 30, in some cases, the computing device 10* may be further designed to determine that the computing device 10* is vibrating in a way that matches with a vibration pattern of the second user 30. By making such a determination, an inference may be made that the computing device 10* is being held or is in contact with the second user 30.

In some embodiments, the computing device 10* may include logic that is designed to determine whether the computing device 10 has moved away from the first user 20 in order to determine whether the computing device 10* has been transferred from the first user 20 to the second user 30. That is, by making such a determination, an inference may be made that the computing device 10* has been transferred from the first user 20 to the second user 30. In some embodiments, in order to make such a determination, data from a combination of sensors 120 may be processed and analyzed.

That is, in order to determine whether the computing device 10 has moved away from the first user 20, a combination of one or more movement sensors 202 (see FIG. 2f) for directly detecting movements of the computing device 10*, one or more image capturing devices 204 (e.g., webcam or digital camera), and/or one or more audio capturing devices 206 (e.g., microphones) may be employed in order to determine whether the computing device 10* is moving away from the first user 20 (and thus, an inference that the computing device 10* has been transferred to the second user 30). For example, the computing device 10* in some cases may employ one or more movement sensors 202 to detect the actual movements of the computing device 10* and one or more image capturing devices 204 (along with facial recognition system/application) to determine that a face associated with the first user 20 is moving away from the computing device 10*. Based on the data provided by both the movement sensors 202 and the image capturing devices 204, at least an inference may be made that the computing device 10* has moved away from the first user 20*.

Figure 3D:
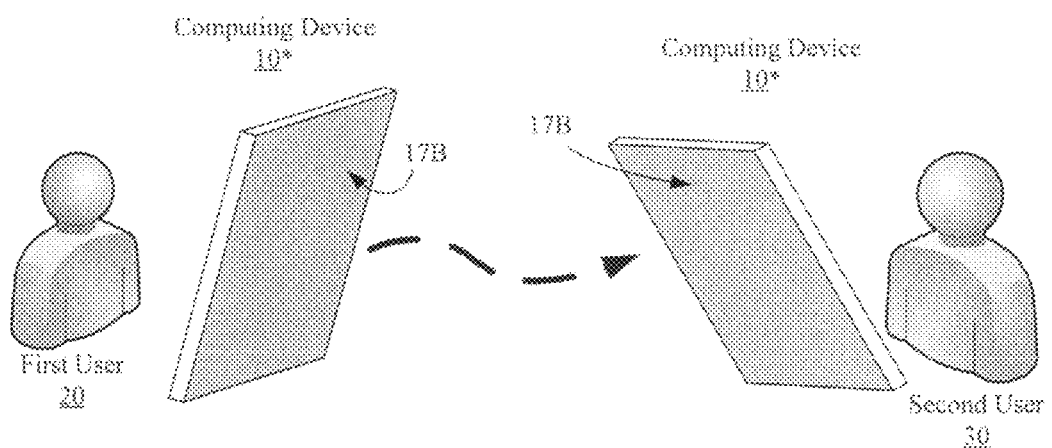
FIG. 3d shows overall 3-dimensional movements of the computing device 10* of FIGS. 2a and 2b that may be detected/monitored by the computing device 10*.

In some embodiments, and as illustrated in FIG. 3d, rather than only detecting/monitoring for a particular type of movement (e.g., tilt-type movements, spin rotation movements, spatial relocation movements, vibration movements, and so forth) the computing device 10* may be endowed with logic that is designed to detect/monitor the overall three-dimensional movements of the computing device 10* and to determine whether the computing device 10* has moved in a particular three-dimensional way that infers that the computing device 10* has been transferred from the first user 20 to the second user 30. In order to accomplish this, the computing device 10 may maintain in its memory 114 (see FIGS. 2a and 2b) a movement library 170 that may include a catalogue or library of movements including three-dimensional movements that when detected as occurring may infer that a transfer of the computing device 10* between two users has occurred.

As described briefly above, in addition to directly detecting the movements of the computing device 10* using movement sensors 202 (e.g., inertia sensors, accelerometers, gyroscopes, and so forth), other types of environmental aspects may be detected/monitored in order to determine whether the computing device 10* has been transferred from a first user 20 to a second user 30. For instance, in some embodiments, the computing device 10* or the logic endowed with the computing device 10* may be designed to detect, using one or more image capturing devices 204, certain visual cues that when detected at least infers the transfer of the computing device 10* from a first user 20 to a second user 30. For example, in some embodiments, the computing device 10* may be endowed with logic that at least detects, via one or more image capturing devices 204, changes in lighting in the proximate vicinity of the computing device 10*. That is, generally when an object is moved from one spatial location to another spatial location, as in the case of a computing device 10* being transferred between two users, the object will be exposed to changes in lighting conditions. Thus, by merely detecting changes in lighting conditions of the computing device 10*, at least an inference may be made that the computing device 10* is being transferred between two users.

Alternatively or additionally, in some embodiments, the computing device 10* may be endowed with a facial recognition system (e.g., facial recognition software) that when employed with one or more image capturing devices 204 may be used in order to determine the presence or absence of a face associated with the first user 20 or the second user 30 within the proximate vicinity of the computing device 10*. If the face associated with the first user 20 is not detected in the proximate vicinity of the computing device 10\* and/or if a face not associated with the first user 20 is detected in the proximate vicinity of the computing device 10\*, such as the face of the second user 30, then a determination or at least an inference may be made that a transfer of the computing device 10\* from the first user 20 to the second user 30 may have occurred. The phrase "proximate vicinity" as used here is in reference to the immediate area surrounding the computing device 10\* or within a distance from the computing device 10\* from which an object or a person is visually (or audibly) discernable or identifiable by the computing device 10\* using, for example, a facial recognition system (or a voice verification system).

Another type of visual cues that the computing device 10\* or at least the logic endowed with the computing device 10\* may look for in order to determine whether the computing device 10\* has been transferred from a first user 20 to a second user 30 is the presence or absence of one or more eyeballs (e.g., irises or retinas) in the proximate vicinity of the computing device 10\* that are determined to be associated with the first user 20 or the second user 30. In particular, if the eyes of the first user 20 is determined not to be at least in the field of view of a image capturing device 204 of the computing device 10\* and/or if one or more eyes of another person (e.g., second user 30) other than the first user 20 is determined to be in the field of view of the image capturing device 204, then at least an inference may be made that the computing device 10\* has been transferred from the first user 20 to the second user 30.

In various embodiments, the computing device 10\* or at least the logic that may be endowed with the computing device 10\* may be designed to look for absence or presence of audio cues in the proximate vicinity of the computing device 10\* in order to determine or at least infer as to whether the computing device 10\* has been transferred from a first user 20 to a second user 30. For example, in some embodiments, the computing device 10\* may be endowed with voice verification system that may be designed to detect, via one or more audio capturing devices 206 (e.g., one or more microphones), a voice in the proximate vicinity of the computing device 10\* having a voice pattern that may be different from the voice pattern of the first user 20. By making such a determination and/or by detecting absence of a voice pattern associated with the first user 20 in the proximate vicinity of the computing device 10\*, an inference may be made that the computing device 10 has been transferred from the first user 20 to the second user 30.

In some embodiments, the computing device 10\* or at least the logic endowed with the computing device 10\* may be designed to determine the transfer of the computing device 10\* from the first user 20 to the second user 30 based on one or more detected movements of the computing device 10\*, one or more detected visual cues, and/or one or more detected audio cues. That is, since in many situations, a particular type of data or measurement (e.g., detected movements of the computing device 10\* or detected visual cues in the proximate vicinity of the computing device 10\*) may not reliably or conclusively indicate that the transfer of the computing device 10\* from the first user 20 to the second user 30 has occurred, in various embodiments, the computing device 10\* may make the determination as to whether the computing device 10\* has been transferred based on different types of measurements (e.g., movements of the computing device 10\*, visual cues, and/or audio cues).

In some embodiments, the determination as to whether the computing device 10\* has been transferred from the first user 20 to the second user 30 may be executed only after it is determined that the computing device 10\* is in (or outside of) one or more predefined geographic locations. That is, in some cases, it may not be necessary or even desirable for the computing device 10\* to make a determination as to whether the computing device 10\* has been transferred from the first user 20 to the second user 30. For example, if the computing device 10\* is located at the home of the first user 20, than there may be no need to make a determination as to whether the computing device 10\* has been transferred from the first user 20 to a second user 30. Thus, in various embodiments, the computing device 10\* may be designed to initiate the determination of whether the computing device 10\* has been transferred from a first user 20 to a second user 30 based on the geographic location of the computing device 10\* as detected by, for example, a global positioning system (GPS) 208 (see FIG. 2*f*), which may be included with the computing device 10\*.

As described earlier, in response to determining that the computing device 10\* has been transferred from the first user 20 to the second user 30, the computing device 10\* or at least the logic that may be endowed with the computing device 10\* may be designed to restrict access to one or more items (e.g., electronic documents, image or audio files, applications, passwords, and so forth). In various embodiments, the one or more items that access may be restricted to may be one or more electronic items that may have been open or running prior to the transfer of the computing device 10\* and/or electronic items that were accessible through the computing device 10\* (e.g., electronic documents and files that were stored in the computing device 10\*) prior to the transfer of the computing device 10\* to the second user 30.

The type of access to be restricted in response to determining that the computing device 10\* has been transferred from the first user 20 to the second user 30 will depend on a number of factors including what types of items are access being restricted to and the amount of access that, for example, the first user 20 (e.g., primary user or owner of the computing device 10\*) is willing to allow the second user 30 to have. For example, if the one or more items are one or more software applications (herein "applications"), then the access restriction may be restriction to one or more functionalities of the one or more applications. Alternatively, access restriction of the one or more applications in some cases may mean access to the one or more applications being completely blocked or hidden. In contrast, if the one or more items are one or more electronic documents (e.g., productivity documents, image or audio files, etc.), then the access restriction that may be applied to such items may relate to editorial access restrictions (e.g., restrictions to the modifications, deletion, addition, and so forth of the items) of the items.

In some cases, restricting access to the one or more items may mean restricting viewing access to the one or more items while in other cases it may mean restricting audio access to the one or more items. In some cases, restricting access to the one or more items may mean complete restriction to access of the one or more items while in other cases, restricting access to the one or more items may mean only a partial restriction to access of the one or more items. In any event, a more detailed discussion related to the various types of access restrictions that may be applied to the one or more items will be provided below with respect to the operations and processes to be described herein.

In some embodiments, the computing device 10\* in response to restricting access to the one or more items, may be designed to generate an alert that indicates that the computing device 10\* has been reconfigured to restrict access to the one or more items. By generating such an alert, the first user 20 is notified that the computing device 10* may be safely shared with the second user 30. Various types of alerts may be generated in various alternative embodiments including, for example, an audio alert (e.g., a ring, a buzz, or a voice with a vocal message), a particular vibration (e.g., the computing device 10* generating a particular vibration before the transfer is completed), and/or visual alerts (e.g., a symbol displayed on a display monitor of the computing device 10* or the background color of the display monitor changing to a pre-defined color).

Referring now to FIGS. 2*a* and 2*b* illustrating two embodiments (illustrated in FIGS. 2*a* and 2*b* as computing device 10' and computing device 10") of the computing device 10* of FIGS. 1, 3*a*, 3*b*, 3*c*, and 3*d*. Referring particularly now to FIG. 2*a*, which illustrates a computing device 10' that includes a transfer determining module 102', an access restricting module 104', an alert generating module 106', a memory 114 (which may store one or more applications 160 and/or a movement library 170), one or more processors 116 (e.g., microprocessors, controllers, etc.), one or more sensors 120, a user interface 110 (e.g., a display monitor such as a touchscreen, a keypad, a mouse, a microphone, a speaker, etc.), and a network interface 112 (e.g., network interface card or NIC).

In various embodiments, the transfer determining module 102' of FIG. 2*a* is a logic module that is designed to determine whether the computing device 10' has been transferred from a first user 20 to a second user 30. The access restricting module 104' is a logic module that is designed to restrict access to one or more items in response to the determination made by the transfer determining module 102'. In contrast, the alert generating module 106' is a logic module that is designed to generate an alert that indicates that the computing device 10' has been reconfigured to restrict access to the one or more items. For this particular embodiment of the computing device 10* of FIGS. 1, 3*a*, 3*b*, 3*c*, and 3*d*, the three logic modules (e.gt., the transfer determining module 102', the access restricting module 104', and the alert generating module 106') are implemented using purely circuitry components such as application specific integrated circuit or ASIC.

Thus, the computing device 10' illustrated in FIG. 2*a* may be referred to as the "hardwired" version or embodiment of the computing device 10* of FIGS. 1, 3*a*, 3*b*, 3*c*, and 3*d*.

Turning now to FIG. 2*b*, which will illustrate a "soft" version or embodiment (e.g., computing device 10") of the computing device 10* of FIGS. 1, 3*a*, 3*b*, 3*c*, and 3*d*. In particular, FIG. 2*b* shows a computing device 10" that has components similar or the same as the components of the computing device 10' of FIG. 2*a*. That is, computing device 10", similar to computing device 10' of FIG. 2*a*, may comprise of a memory 114 (storing one or more applications 160 and/or a movement library 170), one or more processors 116, one or more sensors 120, user interface 110, and/or a network interface 112. And similar to the computing device 10' of FIG. 2*a*, the computing device 10" of FIG. 2*b* may include logic modules including a transfer determining module 102", an access restricting module 104", and an alert generating module 106" that correspond to and mirror the transfer determining module 102', the access restricting module 104', and the alert generating module 106' of the computing device 10' of FIG. 2*a*. However, unlike the logic modules (e.g., the transfer determining module 102', the access restricting module 104', and the alert generating module 106') of the computing device 10' of FIG. 2*a*, the logic modules (e.g., the transfer determining module 102", the access restricting module 104", and the alert generating module 106") of the computing device 10" of FIG. 2*b* are implemented by the one or more processors 116 executing computer readable instructions 152 (e.g., software and/or firmware) that may be stored in the memory 114.

Note that although FIG. 2*a* illustrates all of the logic modules (e.g., the transfer determining module 102', the access restricting module 104', and the alert generating module 106') being implemented using purely circuitry components such as ASIC, and although FIG. 2*b* illustrates all of the logic modules (e.g., the transfer determining module 102", the access restricting module 104", and the alert generating module 106") being implemented using one or more processors 116 executing computer readable instructions 152, in other embodiments, these logic modules may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as FPGA) executing computer readable instructions 152 (e.g., software and/or firmware).

In various embodiments, the memory 114 of the computing device 10' of FIG. 2*a* and the computing device 10" of FIG. 2*b* may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments the one or more applications 160 stored in memory 114 may include, for example, an operating system 162, one or more productivity applications 164 such as a word processing application or a spreadsheet application, one or more communication applications 166 such as an email or IM application, and one or more personal information manager applications 168 (e.g., Microsoft Outlook).

Turning now to FIG. 2*c* illustrating a particular implementation of the transfer determining module 102* (e.g., the transfer determining module 102' or the transfer determining module 102") of FIGS. 2*a* and 2*b*. As illustrated, the transfer determining module 102* may include one or more sub-logic modules in various alternative implementations. For example, in various implementations, the transfer determining module 102* may include a particular movement determining module 210 (which may further include a tilt detecting module 212, a spatial location detecting module 214, a rotation detecting module 216, a moving away detecting module 217, a vibration detecting module 218, and/or a 3-dimensional movement detecting module 219), a visual cue detecting module 220 (which may further include a lighting change detecting module 221, face detecting module 222, an eyeball detecting module 223, and/or a visual moving away detecting module 224), an audio cue detecting module 226 (which may further include a voice pattern detecting module 227 and/or an audio moving away detecting module 228), and/or a geographic location determination module 230. Specific details related to the transfer determining module 102* as well as the above-described sub-modules of the transfer determining module 102* will be provided below with respect to the operations and processes to be described herein.

Figure 2D:
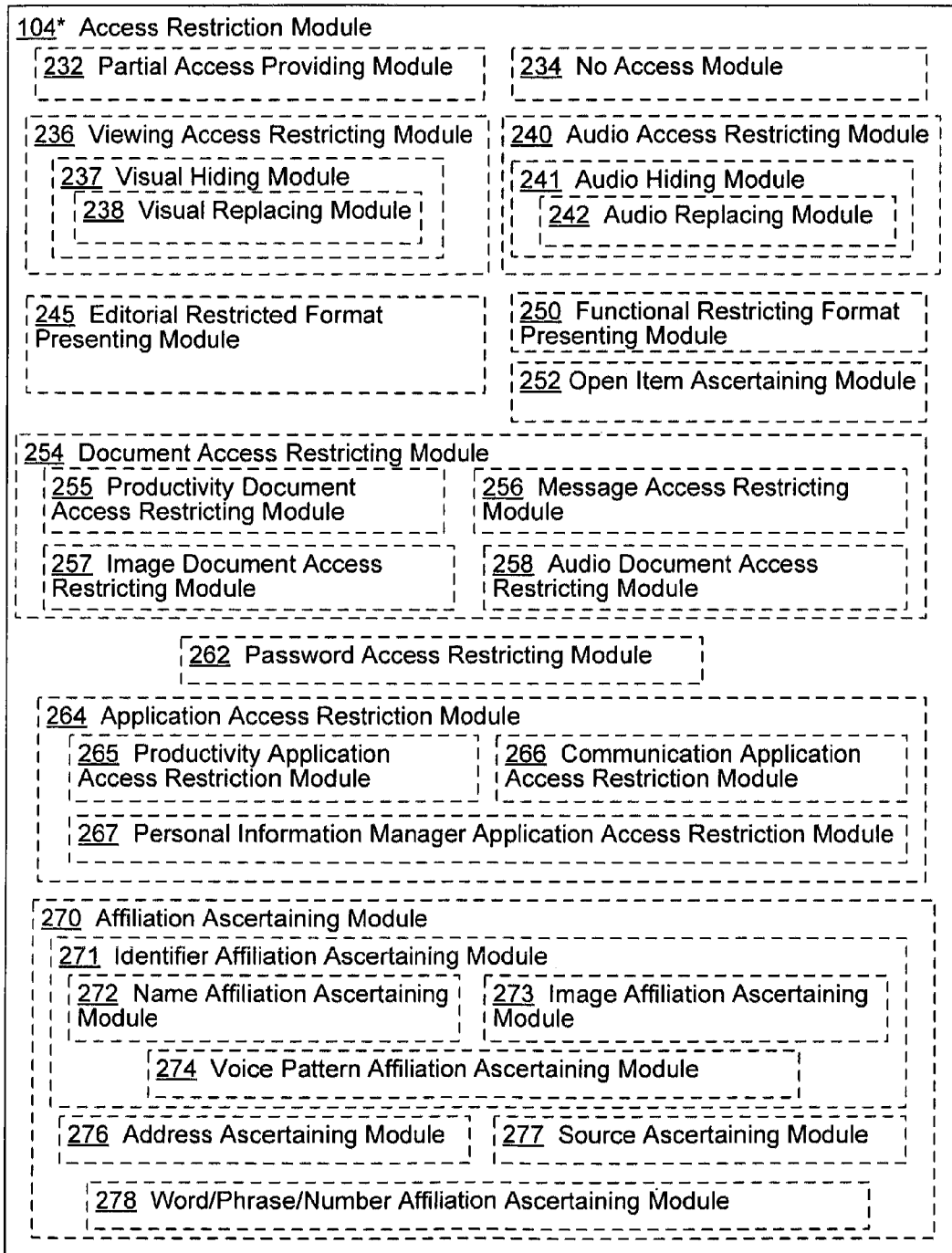
FIG. 2d shows another perspective of the access restricting module 104* of FIGS. 2a and 2b.

Referring now to FIG. 2*d* illustrating a particular implementation of the access restricting module 104* (e.g., the access restricting module 104' or the access restricting module 104") of FIGS. 2*a* and 2*b*. As illustrated, the access restricting module 104* may include one or more sub-logic modules in various alternative implementations. For example, in various implementations, the access restricting module 104* may include a partial access providing module 232, a no access module 234, a viewing access restricting module 236 (which may further include a visual hiding module 237 that may further include a. visual replacing module 238), an audio access restricting module 240 (which may further include an audio hiding module 241 that may further include an audio replacing module 242), an editorial restricted format presenting module 245, a functional restricting format presenting module 250, an open item ascertaining module 252, a document access restricting module 254 (which may further include a productivity document access restricting module 255, a message access restricting module 256, an image document access restricting module 257, and/or an audio document access restricting module 258), and/or a password access restricting module 262. As further illustrated in FIG. 2d, the access restricting module 104*, in various implementations, may also include an application access restriction module 264 (which may further include a productivity application access restriction module 265, a communication application access restriction module 266, and/or a personal information manager application access restriction module 267), and/or an affiliation ascertaining module 270. As further illustrated in FIG. 2d, in various implementations, the affiliation ascertaining module 270 may further include one or more sub-modules including an identifier affiliation ascertaining module 271 (which may further include a name affiliation ascertaining module 272, an image affiliation ascertaining module 273, and/or a voice pattern affiliation ascertaining module 274), an address ascertaining module 276, a source ascertaining module 277, and/or a word/phrase/number affiliation ascertaining module 278. Specific details related to the access restricting module 104* as well as the above-described sub-modules of the access restricting module 104* will be provided below with respect to the operations and processes to be described herein.

Figure 2E:
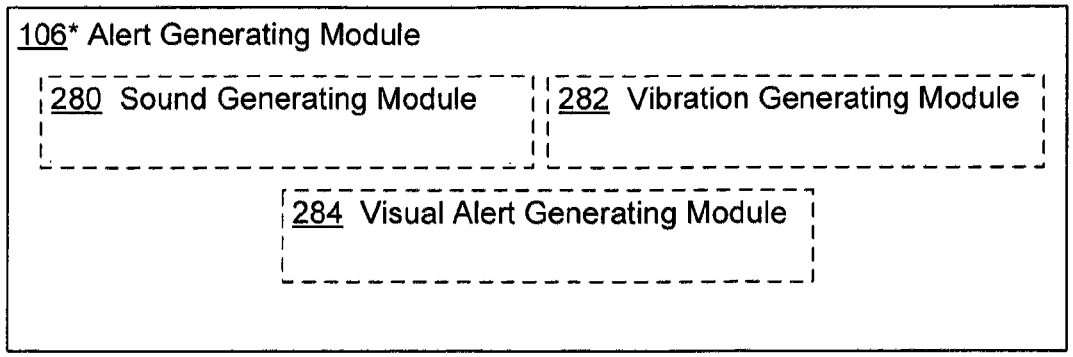
FIG. 2e shows another perspective of the alert generating module 106* of FIGS. 2a and 2b.
Figure 2F:
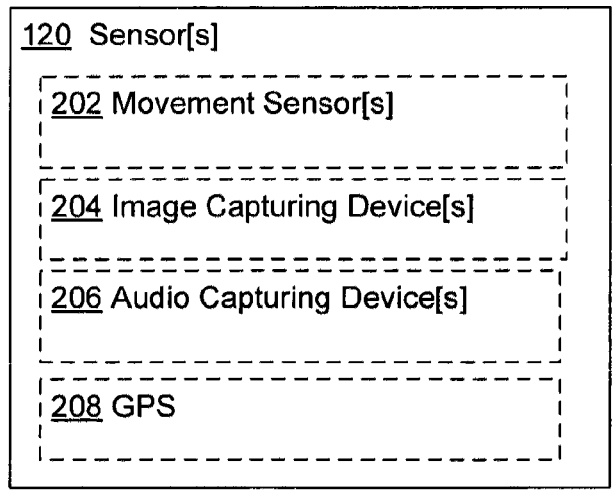
FIG. 2f shows various types of sensors 120 that may be included in the computing device 10* of FIGS. 2a and 2b.

Referring to FIG. 2e illustrating a particular implementation of the alert generating module 106* (e.g., the alert generating module 106' or the alert generating module 106") of FIGS. 2a and 2b. As further illustrated in FIG. 2e, the alert generating module 106* may include a sound generating module 280, a vibration generating module 282, and/or a visual alert generating module 284. Specific details related to the alert generating module 106* as well as the above-described sub-modules of the alert generating module 106* will be provided below with respect to the operations and processes to be described herein.

FIG. 2f illustrates the various types of sensors 120 that may be included with the computing device 10* (e.g., the computing device 10' of FIG. 2a or the computing device 10" of FIG. 2b) of FIGS. 1, 3a, 3b, 3c, and 3d. As illustrated, the sensors 120 that may be included with the computing device 10* may include one or more movement sensors 202 (e.g., an accelerometer, an inertia sensor, and/or a gyro sensor), one or more image capturing devices 204 (e.g., a web cam, a digital camera, etc.), one or more audio capturing devices 206 (e.g., microphones), and/or a global positioning system (GPS) 208 (which may include any device that can determine its geographic location including those devices that determine its geographic location using triangulation techniques applied to signals transmitted by satellites or by communication towers such as cellular towers).

Figure 4:
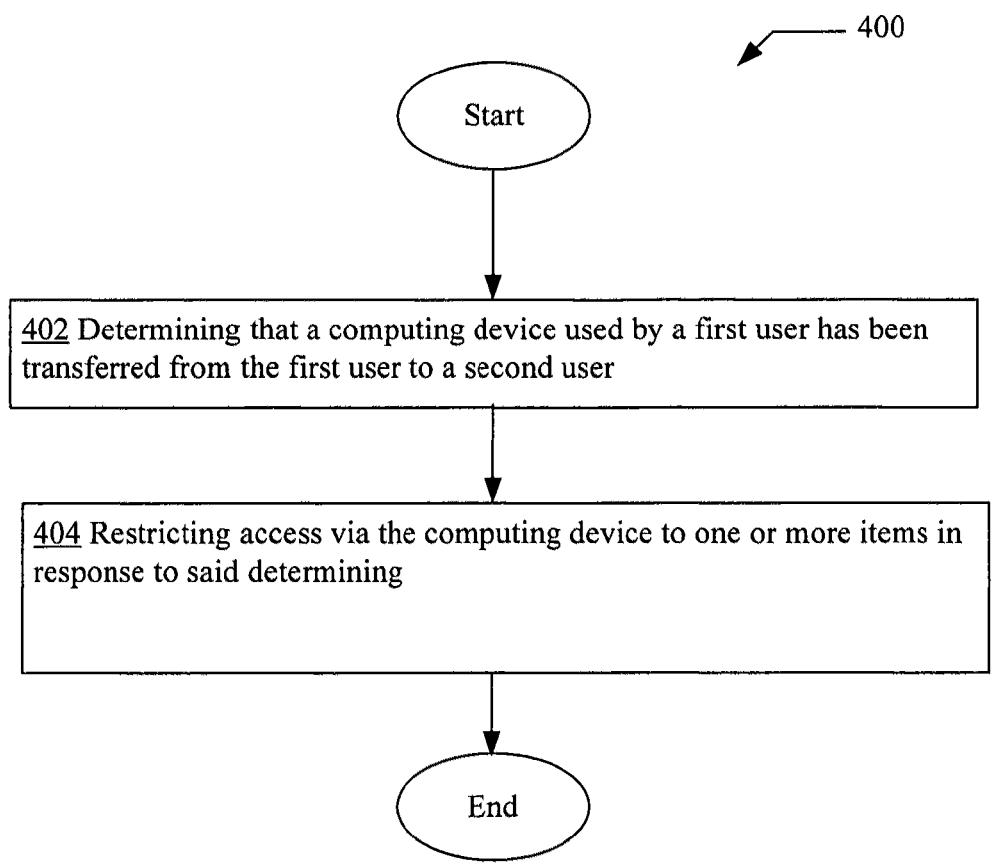
FIG. 4 is a high-level logic flowchart of a process.

A more detailed discussion related to the computing device 10* of FIGS. 1, 3a, 3b, 3c, and 3d (e.g., the computing device 10' of FIG. 2a or the computing device 10" of FIG. 2b) will now be provided with respect to the processes and operations to be described herein. FIG. 4 illustrates an operational flow 400 representing example operations for, among other things, restricting access via a computing device to one or more items (e.g., software applications, electronic documents including productivity documents, audio or image files, electronic messages including emails, passwords, so forth) in response to determining that the computing device has been transferred from a first user 20 to a second user 30. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 2a, 2b, 2c, 2d, 2e, 2f, 3a, 3b, 3c, and 3d) and contexts. However, it should be understood that the operational flows may be executed in a number of other environments and contexts, and/or in modified versions of FIGS. 2a, 2b, 2c, 2d, 2e, 2f, 3a, 3b, 3c, and 3d. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer determining operation 402 for determining that a computing device used by a first user has been transferred from the first user to a second user. For instance, and as an illustration, the transfer determining module 102* (e.g., transfer determining module 102' of FIG. 2a or transfer determining module 102" of FIG. 2b) of the computing device 10* of FIG. 1 (e.g., the computing device 10' of FIG. 2a or the computing device 10" of FIG. 2b) determining that a computing device 10* used by a first user 20 (e.g., a primary user or owner of the computing device 10* of FIG. 1) has been transferred from the first user 20 to a second user 30 (e.g., a person having inferior access rights than the first user 20 to the computing device 10*). Note that in various implementations, the first user 20* may "use" the computing device 10* by logging onto the computing device 10 and/or by employing the computing device 10* to access one or more applications and/or content that may be accessible through the computing device 10*

In addition to the transfer determining operation 402, operational flow 400 may also include an access restricting operation 404 for restricting access via the computing device to one or more items in response to said determining as further illustrated in FIG. 4. For instance, the access restricting module 104* (e.g., access restricting module 104' of FIG. 2a or access restricting module 104" of FIG. 2b) of the computing device 10* of FIG. 1 (e.g., the computing device 10' of FIG. 2a or the computing device 10" of FIG. 2b) restricting access (e.g., hiding or disguising, denying viewing or editorial access, converting to read-only form, and so forth) via the computing device 10 to one or more items (e.g., documents, image or audio files, passwords, applications, and so forth) in response to said determining. As will be further described herein, there are a number of ways to restrict access to the one or more items depending upon a number of factors including, for example, what types of items are access to be restricted to and the amount of restrictions desired by, for example, the first user 20 (e.g., the primary user or owner of the computing device).

For example if the one or more items are one or more productivity documents such as word processing documents then restricting access to such items may involve hiding or disguising representations of the documents in a directory (e.g., deleting document names or subject headings in the directory or replacing the document names or subject headings in the directory with pseudo-names or subject headings). Alternatively, a non-editable form of the documents may be presented in order to restrict access to such documents. If, on the other hand, the one or more items are one or more software applications, then restricting access to such items may involve denying use of one or more functionalities associated with the items (e.g., applications). For example, if the one or more items include a word processing application, then restricting access to such an application may involve, although allowing general access to such an application, disabling one or more editing functions of the application. Other ways of restricting access to the one or more items will be further described herein.

Figure 5A:
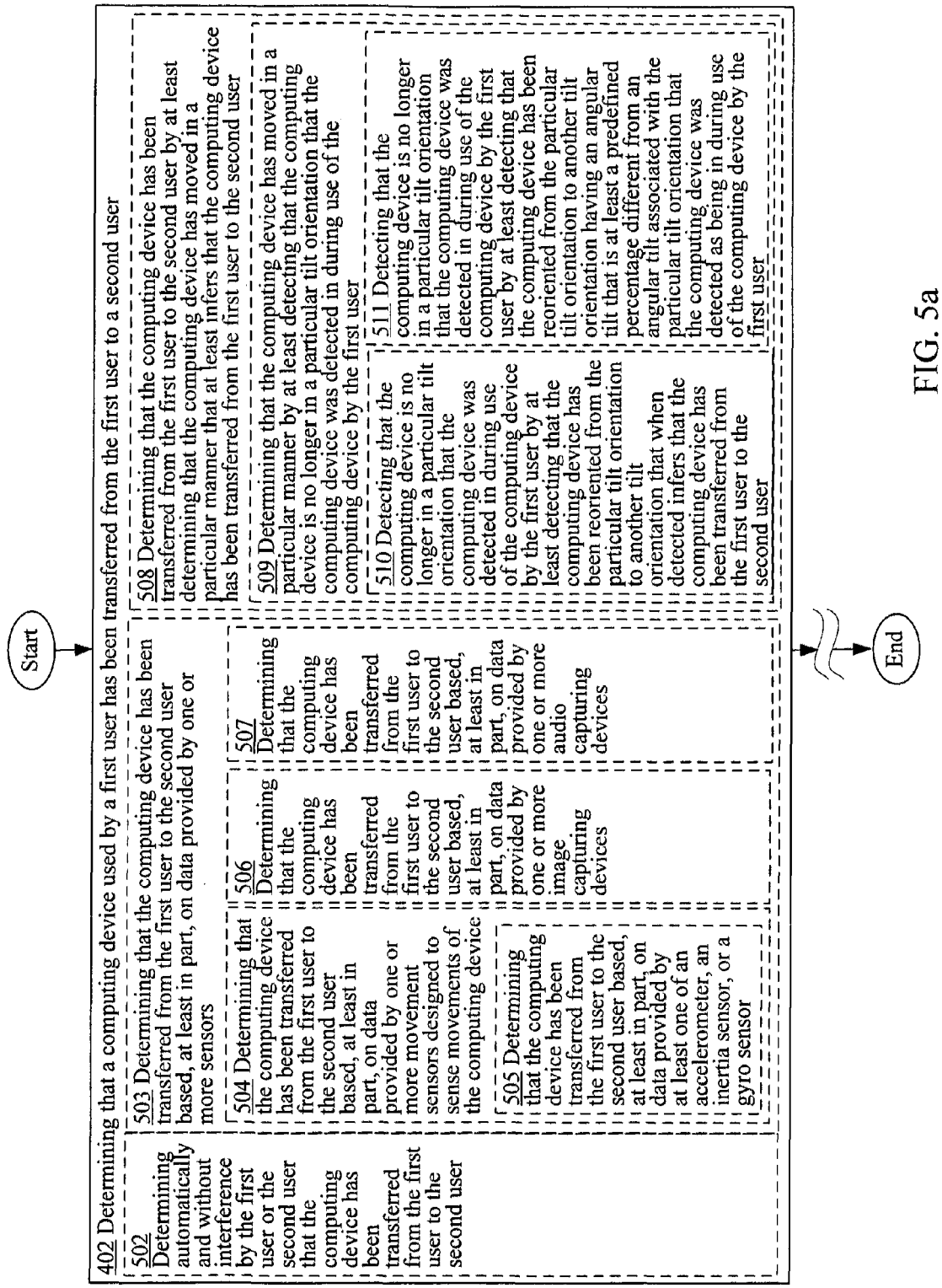
FIG. 5a is a high-level logic flowchart of a process depicting alternate implementations of the transfer determining operation 402 of FIG. 4.

As will be further described herein, the transfer determining operation 402 and the access restricting operation 404 of FIG. 4 may be executed in a variety of different ways in various alternative implementations. FIGS. 5a, 5b, 5c, 5d, 5e, 5f, and 5g, for example, illustrate at least some of the alternative ways that the transfer determining operation 402 of FIG. 4 may be executed in various alternative implementations. For example, in various implementations, the transfer determining operation 402 of FIG. 4 may include an operation 502 for determining automatically and without interference by the first user or the second user that the computing device has been transferred from the first user to the second user as depicted in FIG. 5a. For instance, the transfer determining module 102* (see, for example, the transfer determining module 102' of FIG. 2a or the transfer determining module 102" of FIG. 2b) of the computing device 10* of FIG. 1 (e.g., the computing device 10' of FIG. 2a or the computing device 10" of FIG. 2b) determining automatically and without interference (e.g., without prompting) by the first user 20 or the second user 30 that the computing device 10 has been transferred from the first user 20 to the second user 30.

As further illustrated in FIG. 5a, in some implementations, the transfer determining operation 402 may additionally or alternatively include an operation 503 for determining that the computing device has been transferred from the first user to the second user based, at least in part, on data provided by one or more sensors. For instance, the transfer determining module 102* of the computing device 10* of FIG. 1 (e.g., the computing device 10' of FIG. 2a or the computing device 10" of FIG. 2b) determining that the computing device 10* has been transferred from the first user 20 to the second user 30 based, at least in part, on data provided by one or more sensors 120.

Data from various types of sensors 120 may be used in order to determine whether the computing device 10 has been transferred. For example, and as further illustrated in FIG. 5a, operation 503 may include an operation 504 for determining that the computing device has been transferred from the first user to the second user based, at least in part, on data provided by one or more movement sensors designed to sense movements of the computing device. For instance, the transfer determining module 102* of the computing device 10* of FIG. 1 determining that the computing device 10* has been transferred from the first user 20 to the second user 30 based, at least in part, on data provided by one or more movement sensors 202 that are designed to sense (e.g., directly detect) movements of the computing device 10*.

In some implementations, operation 504 may include an operation 505 for determining that the computing device has been transferred from the first user to the second user based, at least in part, on data provided by at least one of an accelerometer, an inertia sensor, or a gyro sensor as further depicted in FIG. 5a. For instance, the transfer determining module 102* of the computing device 10* of FIG. 1 determining that the computing device 10 has been transferred from the first user 20 to the second user 30 based, at least in part, on data provided by at least one of an accelerometer, an inertia sensor, or a gyro sensor. Note that references to "computing device 10*" in the following description, unless indicated otherwise, is in reference to the computing device 10' of FIG. 2a or to the computing device 10' of FIG. 2b.

In the same or different implementations, operation 503 may include an operation 506 for determining that the computing device has been transferred from the first user to the second user based, at least in part, on data provided by one or more image capturing devices. For instance, the transfer determining module 102* of the computing device 10* of FIG. 1 determining that the computing device 10* has been transferred from the first user 20 to the second user 30 based, at least in part, on data provided by one or more image capturing devices 204 (e.g., a webcam, a digital camera, and so forth), which may be integrated in the computing device 10*.

In the same or alternative implementations, operation 503 may include an operation 507 for determining that the computing device has been transferred from the first user to the second user based, at least in part, on data provided by one or more audio capturing devices. For instance, the transfer determining module 102* of the computing device 10* of FIG. 1 determining that the computing device 10* has been transferred from the first user 20 to the second user 30 based, at least in part, on data provided by one or more audio capturing devices 206 (e.g., microphone), which may be integrated in the computing device 10*.

In various implementations, the transfer determining operation 402 of FIG. 4 may involve making the determination that the computing device 10* has been transferred from the first user 20 to the second user 30 based, at least in part, on the movements of the computing device 10*. For example, in some implementations, the transfer determining operation 402 may include an operation 508 for determining that the computing device has been transferred from the first user to the second user by at least determining that the computing device has moved in a particular manner that at least infers that the computing device has been transferred from the first user to the second user as depicted in FIG. 5a. For instance, the transfer determining module 102* including a particular movement determining module 210 (see FIG. 2C) of the computing device 10* determining that the computing device 10* has been transferred from the first user 20 to the second user 30 by the particular movement determining module 210 at least determining that the computing device 10* has moved in a particular manner (e.g., has spatially moved along a particular path or moved to a particular spatial location with respect to its initial spatial location) that at least infers (e.g., implies) that the computing device 10* has been transferred from the first user 20 to the second user 30.

Figure 5B:
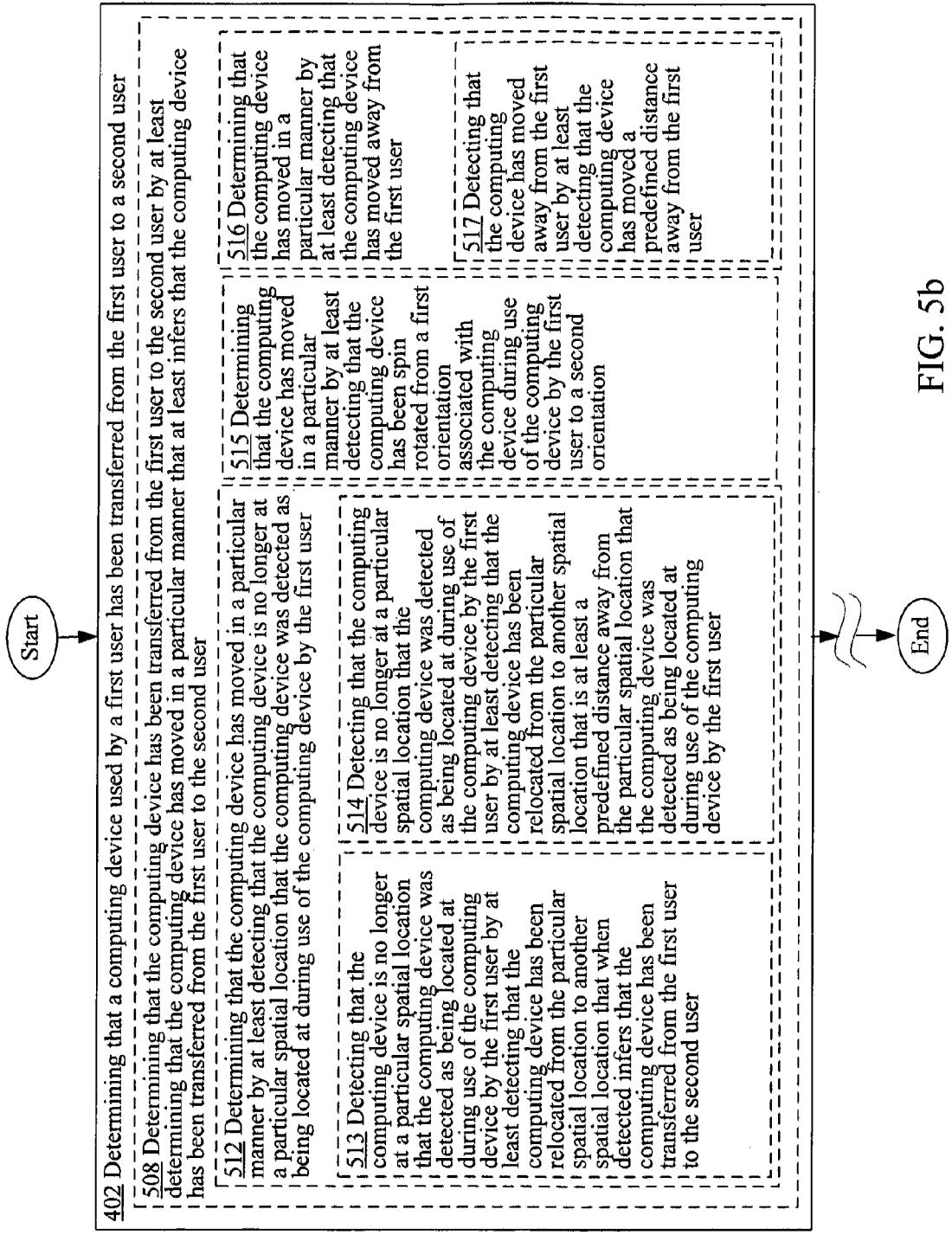
FIG. 5b is a high-level logic flowchart of a process depicting alternate implementations of the transfer determining operation 402 of FIG. 4.
Figure 5C:
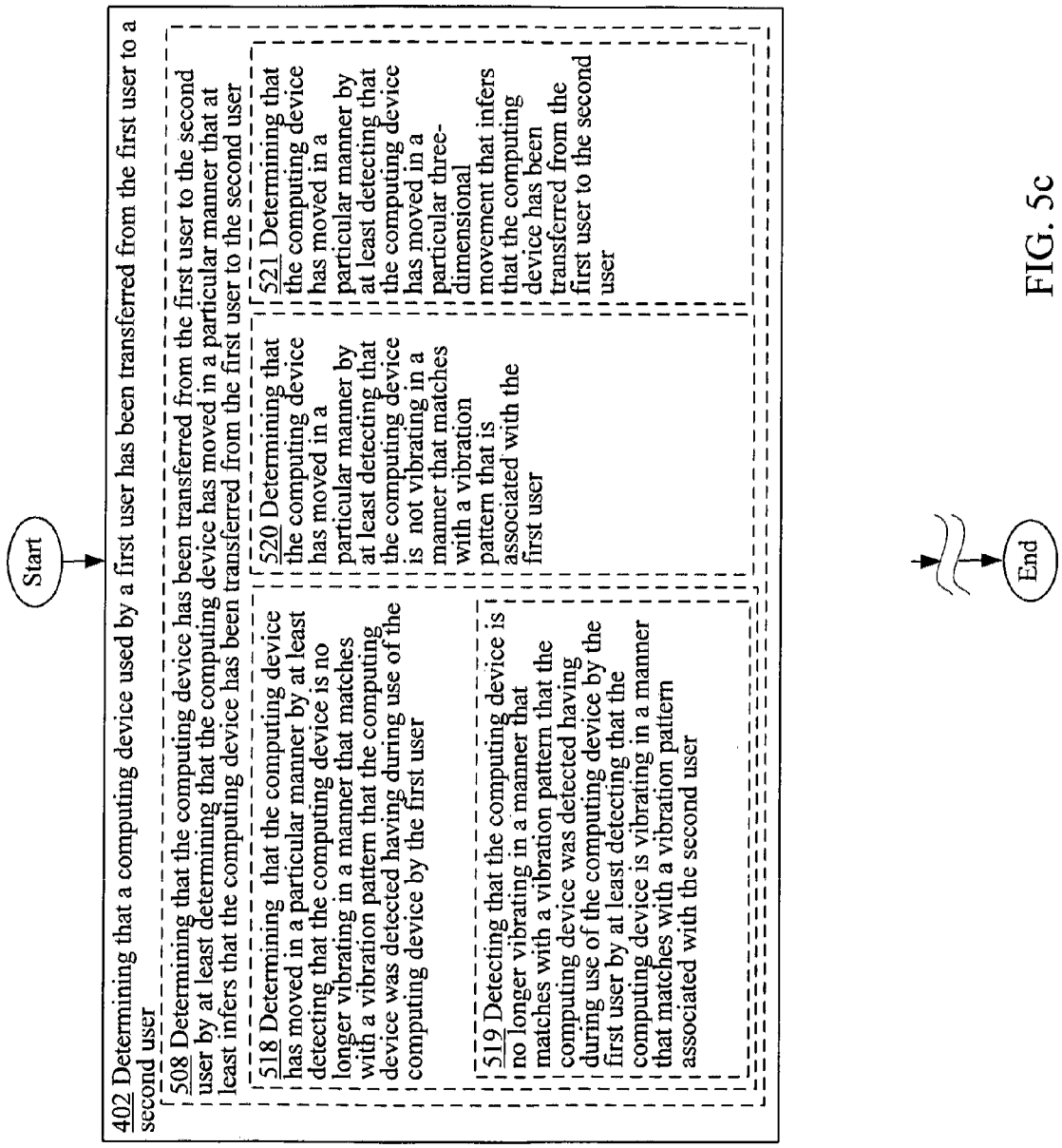
FIG. 5c is a high-level logic flowchart of a process depicting alternate implementations of the transfer determining operation 402 of FIG. 4.

As further illustrated in FIGS. 5a, 5b, and 5c, operation 508 may involve detecting various types of movements of the computing device 10* in order to determine or at least infer that the computing device 10* has been transferred from a first user 20 to a second user 30. For example, in some implementations, operation 508 may include an operation 509 for determining that the computing device has moved in a particular manner by at least detecting that the computing device is no longer in a particular tilt orientation that the computing device was detected in during use of the computing device by the first user as illustrated in FIG. 5a. For instance, the particular movement determining module 210 including the tilt detecting module 212 (see FIG. 2c) of the computing device 10* determining that the computing device 10* has moved in a particular manner by the tilt detecting module 212 at least detecting that the computing device 10* is no longer in a particular tilt orientation that the computing device 10* was detected in during use of the computing device 10* by the first user 20. Thus, in some implementations, the computing device 10* may also be endowed with logic to determine whether the computing device 10 is being used by the first user 20. Such a determination may be made by a number of means including, for example, the use of facial recognition system to determine whether the face of the first user 20* is detected in the vicinity of the computing device 10* (e.g., in the visual range of a webcam or other types of image capturing devices 204 that may be part of the computing device 10*).

In some cases, operation 509 may, in turn, include an operation 510 for detecting that the computing device is no longer in a particular tilt orientation that the computing device was detected in during use of the computing device by the first user by at least detecting that the computing device has been reoriented from the particular tilt orientation to another tilt orientation that when detected infers that the computing device has been transferred from the first user to the second user as further depicted in FIG. 5a. For instance, the tilt detecting module 212 of the computing device 10* detecting that the computing device 10* is no longer in a particular tilt orientation that the computing device 10* was detected in during use of the computing device 10* by the first user 20 by at least detecting that the computing device 10* has been reoriented from the particular tilt orientation to another tilt orientation that when detected infers that the computing device 10* has been transferred from the first user 20 to the second user 30.

In the same or different implementations, operation 509 may include an operation 511 for detecting that the computing device is no longer in a particular tilt orientation that the computing device was detected in during use of the computing device by the first user by at least detecting that the computing device has been reoriented from the particular tilt orientation to another tilt orientation having an angular tilt that is at least a predefined percentage different from an angular tilt associated with the particular tilt orientation that the computing device was detected as being in during use of the computing device by the first user as further depicted in FIG. 5a. For instance, the tilt detecting module 212 of the computing device 10* detecting that the computing device 10* is no longer in a particular tilt orientation that the computing device 10* was detected in during use of the computing device 10* by the first user 20 by at least detecting that the computing device 10* has been reoriented from the particular tilt orientation to another tilt orientation having an angular tilt that is at least a predefined percentage different from an angular tilt associated with the particular tilt orientation that the computing device 10* was detected as being in during use of the computing device 10* by the first user 20. Such an operation may be executed in order to, for example, filter out "noise" tilts (e.g., random changes in tilt caused by the first user 20 when, for example, the first user 20 accidentally or intentionally moves his/her body or hands in order to, for example, get in a more comfortable body position causing the computing device 10* to move and change in tilt orientation).

In various implementations, the operation 508 for determining that the computing device has been transferred from the first user to the second user by at least determining that the computing device has moved in a particular manner that at least infers that the computing device has been transferred from the first user to the second user may involve detecting that the computing device 10* has at least been relocated away from a particular location. For example, in some implementations, operation 508 may include an operation 512 for determining that the computing device has moved in a particular manner by at least detecting that the computing device is no longer at a particular spatial location that the computing device was detected as being located at during use of the computing device by the first user as depicted in FIG. 5b. For instance, the particular movement determining module 210 including the spatial location detecting module 214 (see FIG. 2c) of the computing device 10* determining that the computing device 10* has moved in a particular manner by at least detecting that the computing device 10* is no longer at a particular spatial location (e.g., see spatial location 46 of FIG. 3d) that the computing device 10* was detected as being located at during use of the computing device 10* by the first user 20 (e.g., when the computing device 10* was in the possession of the first user 20).

In various implementations, operation 512 may include an operation 513 for detecting that the computing device is no longer at a particular spatial location that the computing device was detected as being located at during use of the computing device by the first user by at least detecting that the computing device has been relocated from the particular spatial location to another spatial location that when detected infers that the computing device has been transferred from the first user to the second user. For instance, the spatial location detection module 214 of the computing device 10* detecting that the computing device 10* is no longer at a particular spatial location 46 (see FIG. 3d) that the computing device 10* was detected as being located at during use of the computing device 10*by the first user 20 by at least detecting that the computing device 10* has been relocated from the particular spatial location 46 to another spatial location 48 that when detected infers that the computing device 10*has been transferred from the first user 20 to the second user 30.

In the same or different implementations, operation 512 may include an operation 514 for detecting that the computing device is no longer at a particular spatial location that the computing device was detected as being located at during use of the computing device by the first user by at least detecting that the computing device has been relocated from the particular spatial location to another spatial location that is at least a predefined distance away from the particular spatial location that the computing device was detected as being located at during use of the computing device by the first user. For instance, the spatial location detection module 214 of the computing device 10* detecting that the computing device 10* is no longer at a particular spatial location (e.g., spatial location 46 of FIG. 3c) that the computing device 10* was detected as being located at during use of the computing device 10* by the first user 20 by at least detecting that the computing device 10* has been relocated from the particular spatial location 46 to another spatial location 48 that is at least a predefined distance away from the particular spatial location 46 that the computing device 10* was detected as being located at during use of the computing device 10* by the first user 20 (and prior to the relocation of the computing device 10*).

In various implementations, operation 508 for determining that the computing device has been transferred from the first user to the second user by at least determining that the computing device has moved in a particular manner that at least infers that the computing device has been transferred from the first user to the second user may include an operation 515 for determining that the computing device has moved in a particular manner by at least detecting that the computing device has been spin rotated from a first orientation associated with the computing device during use of the computing device by the first user to a second orientation. For instance, the particular movement determining module 210 including the rotation detecting module 216 (see FIG. 2c) of the computing device 10* determining that the computing device 10* has moved in a particular manner by at least detecting that the computing device 10* has been spin rotated from a first orientation associated with the computing device 10* during use of the computing device 10* by the first user 20 to a second orientation.

In the same or different implementations, operation 508 may include an operation 516 for determining that the computing device has moved in a particular manner by at least detecting that the computing device has moved away from the first user. For instance, the particular movement determining module 210 including the moving away detecting module 217 (see FIG. 2c) of the computing device 10* determining that the computing device 10* has moved in a particular manner by at least detecting that the computing device 10* has moved away from the first user 20. Such detection may be based on data provided by one or more sensors 120 including one or more movement sensors 202, one or more image capturing devices 204 (which may detect the face of the first user 20 moving away from the computing device 10*), and/or one or more audio capturing devices 206 (which may detect the speech signature of the first user 20 diminishing inferring that the first user 20 may be moving away from the computing device 10*).

In some implementations, operation 516 may further include an operation 517 for detecting that the computing device has moved away from the first user by at least detecting that the computing device has moved a predefined distance away from the first user. For instance, the moving away detecting module 217 of the computing device 10* detecting that the computing device 10*has moved away from the first user 20 by at least detecting that the computing device 10* has moved a predefined distance away from the first user 20. In doing so, the computing device 10* may filter out movements that may be considered "noise" (e.g., random or accidental relocation movements of the computing device 10* caused by, for example, the random or accidental movements of the first user 20 holding the computing device 10*).

In various embodiments, operation 508 for determining that the computing device has been transferred from the first user to the second user by at least determining that the computing device has moved in a particular manner that at least infers that the computing device has been transferred from the first user to the second user may involve tracking or sensing vibrations that are exposed to the computing device 10*. That is, each user may be associated with relatively unique signature vibration pattern (e.g., heart rate). Thus, by detecting at least a change in vibration, at least an inference may be made that a transfer of the computing device 10* may have occurred. Thus, in various implementations, operation 508 may include an operation 518 for determining that the computing device has moved in a particular manner by at least detecting that the computing device is no longer vibrating in a manner that matches with a vibration pattern that the computing device was detected having during use of the computing device by the first user as illustrated in FIG. 5c. For instance, the particular movement determining module 210 including the vibration detecting module 218 (see FIG. 2c) of the computing device 10* determining that the computing device 10* has moved in a particular manner when the vibration detecting module 218 at least detects that the computing device 10* is no longer vibrating in a manner that matches with a vibration pattern that the computing device 10* was detected having during use of the computing device 10* by the first user 20.

As further illustrated in FIG. 5c, in some implementations, operation 518 may further include an operation 519 for detecting that the computing device is no longer vibrating in a manner that matches with a vibration pattern that the computing device was detected having during use of the computing device by the first user by at least detecting that the computing device is vibrating in a manner that matches with a vibration pattern associated with the second user. For instance, the vibration detecting module 218 of the computing device 10* detecting that the computing device 10* is no longer vibrating in a manner that matches with a vibration pattern that the computing device 10* was detected having during use of the computing device 10* by the first user 20 by at least detecting that the computing device 10* is vibrating in a manner that matches with a vibration pattern (e.g., signature vibration) associated with the second user 30.

In the same or different implementations, operation 508 may include an operation 520 for determining that the computing device has moved in a particular manner by at least detecting that the computing device is not vibrating in a manner that matches with a vibration pattern that is associated with the first user. For instance, particular movement determining module 210 including the vibration detecting module 218 of the computing device 10* determining that the computing device 10* has moved in a particular manner by at least detecting that the computing device 10* is not vibrating in a manner that matches with a vibration pattern that is associated with the first user 20.

In various implementations, operation 508 for determining that the computing device has been transferred from the first user to the second user by at least determining that the computing device has moved in a particular manner that at least infers that the computing device has been transferred from the first user to the second user may involve tracking the overall movements of the computing device 10* rather than tracking a particular type of movements (e.g., tilt movements, spin rotation movements, spatial relocation movements, vibration movements, etc.) in order to determine whether the computing device 10* has been transferred from the first user 20 to the second user 30. For example, in some implementations, operation 508 may include an operation 521 for determining that the computing device has moved in a particular manner by at least detecting that the computing device has moved in a particular three-dimensional movement that infers that the computing device has been transferred from the first user to the second user. For instance, the particular movement determining module 210 including the three-dimensional movement detecting module 219 (see FIG. 2c) of the computing device 10* determining that the computing device 10* has moved in a particular manner by the three-dimensional movement detecting module 219 at least detecting that the computing device 10* has moved in a particular three-dimensional movement that infers that the computing device 10* has been transferred from the first user 20 to the second user 30.

Figure 5D:
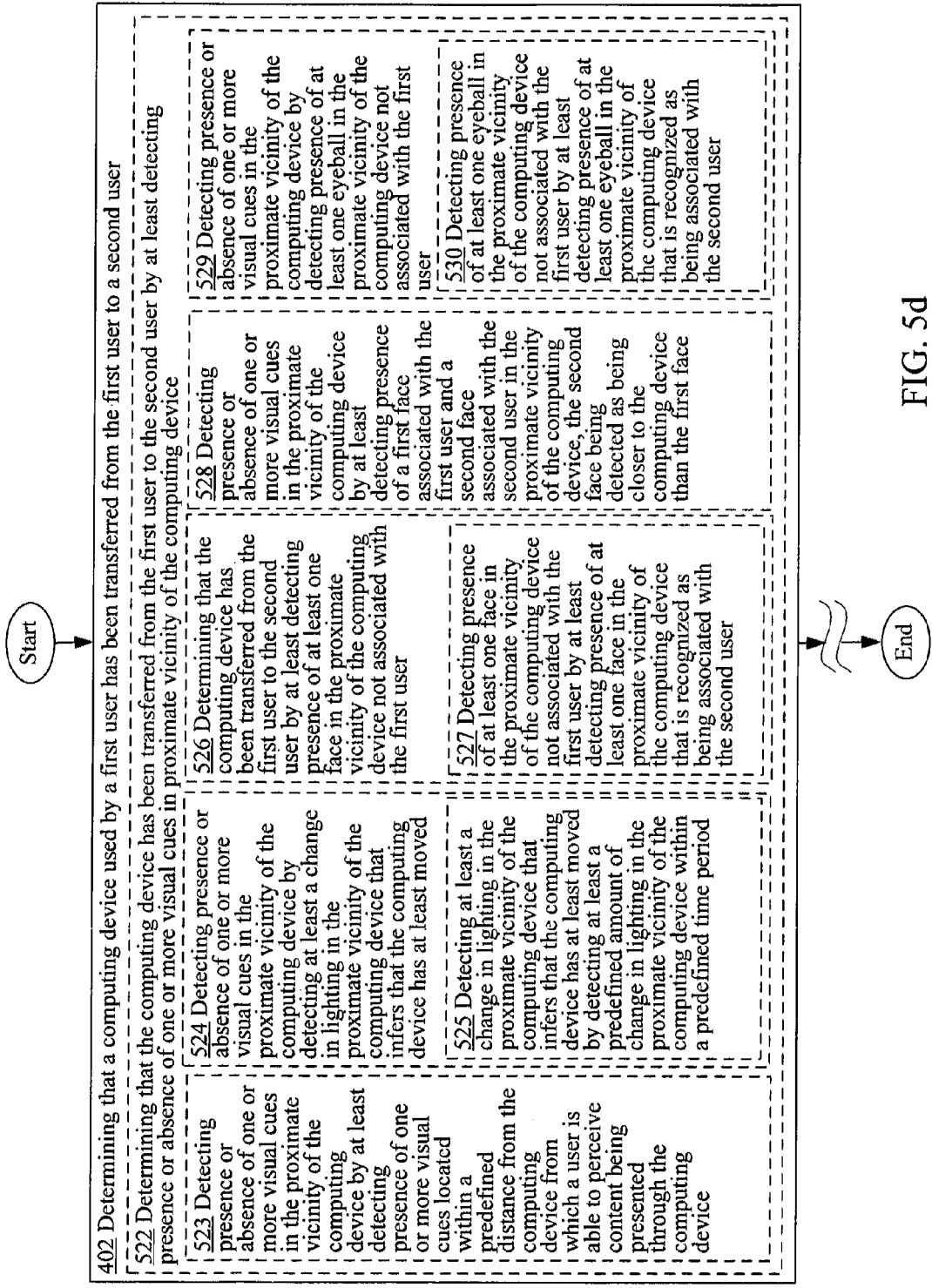
FIG. 5d is a high-level logic flowchart of a process depicting alternate implementations of the transfer determining operation 402 of FIG. 4.

In various implementations, the transfer determining operation 402 of FIG. 4 may involve determining that the computing device 10* has been transferred from the first user 20 to the second user 30 based on visual cues. For example, in some implementations, the transfer determining operation 402 may include an operation 522 for determining that the computing device has been transferred from the first user to the second user by at least detecting presence or absence of one or more visual cues in proximate vicinity of the computing device as illustrated in FIG. 5d. For instance, the transfer determining module 102* including the visual cue detecting module 220 (see FIG. 2c) of the computing device 10* determining that the computing device 10* has been transferred from the first user 20 to the second user 30 by the visual cue detecting module 220 at least detecting presence or absence of one or more visual cues (e.g., detecting presence or absence of faces of the first user 20 and/or second user 30, detecting background movement relative to the computing device 10*, and so forth) in proximate vicinity (e.g., within a distance from the computing device 10* from which an object or a person is visually discernable or identifiable by the computing device 10*) of the computing device 10*.

Figure 5E:
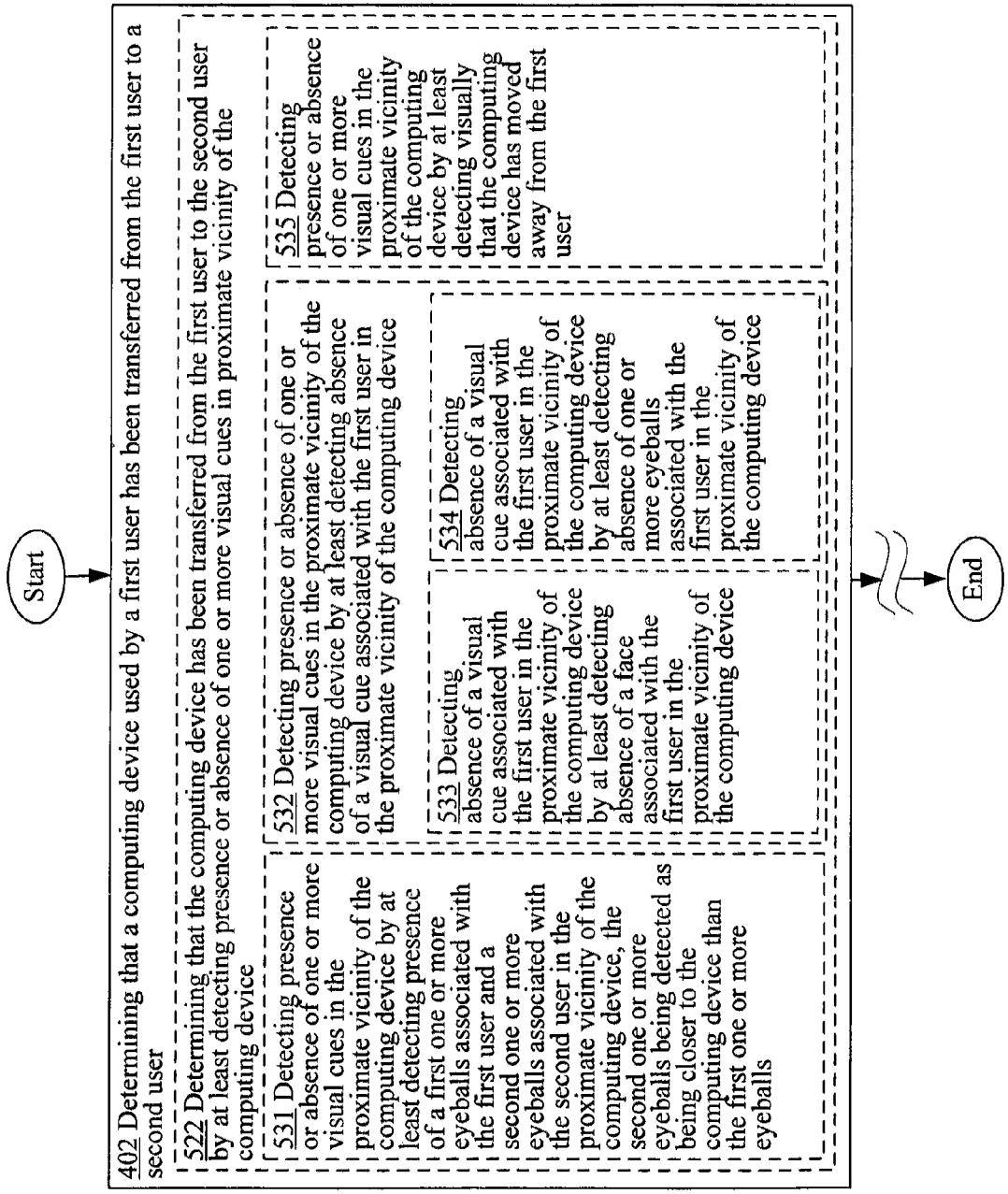
FIG. 5e is a high-level logic flowchart of a process depicting alternate implementations of the transfer determining operation 402 of FIG. 4.

As further illustrated in FIGS. 5d and 5e, operation 522 may be implemented in a number of different ways in various alternative implementations. For example, in some implementations, operation 522 may include an operation 523 for detecting presence or absence of one or more visual cues in the proximate vicinity of the computing device by at least detecting presence of one or more visual cues located within a predefined distance from the computing device from which a user is able to perceive content being presented through the computing device. For instance, the visual cue detecting module 220 of the computing device 10* detecting presence or absence of one or more visual cues in the proximate vicinity of the computing device 10* by at least detecting presence of one or more visual cues located within a predefined distance from the computing device 10* from which a user is able to perceive content being presented through the computing device 10*. For example, if the face of the second user 30 is determined to be within a distance from the computing device 10* from which the second user 30 is able to ascertain what is displaying through the computing device 10*, than determining that the transfer of the computing device 10* has occurred from the first user 20 to the second user 30.

In the same or different implementations, operation 522 may include an operation 524 for detecting presence or absence of one or more visual cues in the proximate vicinity of the computing device by detecting at least a change in lighting in the proximate vicinity of the computing device that infers that the computing device has at least moved. For instance, the visual cue detecting module 220 including the lighting change detecting module 221 (see FIG. 2c) of the computing device 10* detecting presence or absence of one or more visual cues in the proximate vicinity of the computing device 10* by detecting at least a change in lighting in the proximate vicinity of the computing device 10* that infers that the computing device 10*has at least moved. That is, typically when an item such as a computing device 10* is moved from one location to another location, there may be a variation in the type/amount of light being exposed to the item. Thus, by merely detecting changes in lighting conditions surrounding the computing device 10*, an inference could be made that, for example, a computing device 10* is being moved and being transferred.

In some cases, operation 524 may further include an operation 525 for detecting at least a change in lighting in the proximate vicinity of the computing device that infers that the computing device has at least moved by detecting at least a predefined amount of change in lighting in the proximate vicinity of the computing device within a predefined time period as further depicted in FIG. 5d. For instance, the lighting change detecting module 221 of the computing device 10* detecting at least a change in lighting in the proximate vicinity of the computing device 10* that infers that the computing device 10* has at least moved (e.g. has been relocated) by detecting at least a predefined amount of change in lighting in the proximate vicinity of the computing device 10* within a predefined time period. In doing so, inconsequential lighting changes will be filtered out such as those as a result of changes in daylight, which typically occurs slowly.

In the same or different implementations, operation 522 may include an operation 526 for determining that the computing device has been transferred from the first user to the second user by at least detecting presence of at least one face in the proximate vicinity of the computing device not associated with the first user. For instance, the transfer determining module 102* including the face detecting module 222 (see FIG. 2c) of the computing device 10* determining that the computing device 10* has been transferred from the first user 20 to the second user 30 by the face detecting module 222 at least detecting presence of at least one face (e.g., detecting presence of the at least one face based on image data provided by an image capturing device 204) in the proximate vicinity of the computing device 10* not associated with the first user 20.

As further illustrated in FIG. 5d, operation 526, in some implementations, may include an operation 527 for detecting presence of at least one face in the proximate vicinity of the computing device not associated with the first user by at least detecting presence of at least one face in the proximate vicinity of the computing device that is recognized as being associated with the second user. For instance, the face detecting module 222 of the computing device 10* detecting presence of at least one face in the proximate vicinity of the computing device 10* not associated with the first user 20 by at least detecting presence of at least one face in the proximate vicinity of the computing device 10* that is recognized as being associated with the second user 30. In some cases, the computing device 10 may store in its memory 114 facial images of one or more third parties including a facial image of the second user 30.

In some cases, operation 522 may alternatively or additionally include an operation 528 for detecting presence or absence of one or more visual cues in the proximate vicinity of the computing device by at least detecting presence of a first face associated with the first user and a second face associated with the second user in the proximate vicinity of the computing device, the second face being detected as being closer to the computing device than the first face. For instance, the visual cue detecting module 220 including the face detecting module 222 of the computing device 10* detecting presence or absence of one or more visual cues in the proximate vicinity of the computing device 10*by the face detecting module 222 at least detecting presence of a first face associated with the first user 20 and a second face associated with the second user 30 in the proximate vicinity of the computing device 10*, the second face being detected as being closer to the computing device 10*than the first face of the first user 20.

In the same or different implementations, operation 522 may include an operation 529 for detecting presence or absence of one or more visual cues in the proximate vicinity of the computing device by detecting presence of at least one eyeball in the proximate vicinity of the computing device not associated with the first user as further depicted in FIG. 5d. For instance, the visual cue detecting module 220 including the eyeball detecting module 223 of the computing device 10* detecting presence or absence of one or more visual cues in the proximate vicinity of the computing device 10* by having the eyeball detecting module 223 detecting presence of at least one eyeball (e.g., iris or retina characteristics) in the proximate vicinity of the computing device 10* not associated with the first user 20. In other words, determining that there is at least one eyeball having iris or retina characteristics in the proximate vicinity of the computing device 10* that is different from the iris or retina characteristics of the first user 20.

In some cases operation 529 may further include an operation 530 for detecting presence of at least one eyeball in the proximate vicinity of the computing device not associated with the first user by at least detecting presence of at least one eyeball in the proximate vicinity of the computing device that is recognized as being associated with the second user. For instance, the eyeball detecting module 223 of the computing device 10* detecting of at least one eyeball in the proximate vicinity of the computing device 10* not associated with the first user 20 by at least detecting presence of at least one eyeball in the proximate vicinity of the computing device 10* that is recognized as being associated with the second user 30. Thus, in some cases, the computing device 10* may store in its memory 114 images of eyeballs (e.g., images of irises or retinas) belonging to one or more third parties including the second user 30.

In the same or different implementations, operation 522 may include an operation 531 for detecting presence or absence of one or more visual cues in the proximate vicinity of the computing device by at least detecting presence of a first one or more eyeballs associated with the first user and a second one or more eyeballs associated with the second user in the proximate vicinity of the computing device, the second one or more eyeballs being detected as being closer to the computing device than the first one or more eyeballs as further depicted in FIG. 5e. For instance, the visual cue detecting module 220 including the eyeball detecting module 223 of the computing device 10* detecting presence or absence of one or more visual cues in the proximate vicinity of the computing device 10* by the eyeball detecting module 223 at least detecting presence of a first one or more eyeballs associated with the first user 20 and a second one or more eyeballs associated with the second user 30 in the proximate vicinity of the computing device 10*, the second one or more eyeballs being detected as being closer to the computing device 10* than the first one or more eyeballs.

In the same or different implementations, operation 522 may include an operation 532 for detecting presence or absence of one or more visual cues in the proximate vicinity of the computing device by at least detecting absence of a visual cue associated with the first user in the proximate vicinity of the computing device as further illustrated in FIG. 5e. For instance, the visual cue detecting module 220 of the computing device 10* detecting presence or absence of one or more visual cues in the proximate vicinity of the computing device 10* by at least detecting absence of a visual cue associated with the first user 20 in the proximate vicinity of the computing device 10*.

As further illustrated in FIG. 5e, in some implementations, operation 532 may include one or more additional operations including an operation 533 for detecting absence of a visual cue associated with the first user in the proximate vicinity of the computing device by at least detecting absence of a face associated with the first user in the proximate vicinity of the computing device. For instance, the visual cue detecting module 220 including the face detecting module 222 of the computing device 10 detecting absence of a visual cue associated with the first user 20 in the proximate vicinity of the computing device 10* by at least detecting absence of a face associated with the first user 20 in the proximate vicinity of the computing device 10*. For example, if the computing device 10* includes an image capturing device 204, such as a webcam, then the computing device 10* may detect the absence of the visual cue of the first user 20 when the webcam does not detect the face of the first user 20* near the computing device 10* (e.g., within 5 feet, 10 feet, 12 feet, or within some other distance from the computing device 10* that a face of the first user 20 can be detected/identified by the computing device 10*).

In the same or different implementations, operation 532 may include an operation 534 for detecting absence of a visual cue associated with the first user in the proximate vicinity of the computing device by at least detecting absence of one or more eyeballs associated with the first user in the proximate vicinity of the computing device as further depicted in FIG. 5e. For instance, the visual cue detecting module 220 including the eyeball detecting module 223 of the computing device 10* detecting absence of a visual cue associated with the first user 20 in the proximate vicinity of the computing device 10* by the eyeball detecting module 223 at least detecting absence of one or more eyeballs associated with the first user 20 in the proximate vicinity of the computing device 10*. For example, if the computing device 10* includes an image capturing device 204, then the computing device 10* may detect the absence of the visual cue of the first user 20 when the image capturing device 204 does not detect the one or more eyeballs of the first user 20* near the computing device 10* (e.g., within 2 feet, 4 feet, 6 feet, or within some other distance from the computing device 10* that an eyeball of the first user 20 can be detected/identified by the computing device 10*).

In various implementations, operation 522 for determining that the computing device has been transferred from the first user to the second user by at least detecting presence or absence of one or more visual cues in proximate vicinity of the computing device may further include an operation 535 for detecting presence or absence of one or more visual cues in the proximate vicinity of the computing device by at least detecting visually that the computing device has moved away from the first user as further depicted in FIG. 5e. For instance, the visual cue detecting module 220 including the visual moving away detecting module 224 of the computing device 10* detecting presence or absence of one or more visual cues in the proximate vicinity of the computing device 10* by the visual moving away detecting module 224 at least detecting visually (e.g., via an image capturing device 204) that the computing device 10* has moved away from the first user 20.

Figure 5F:
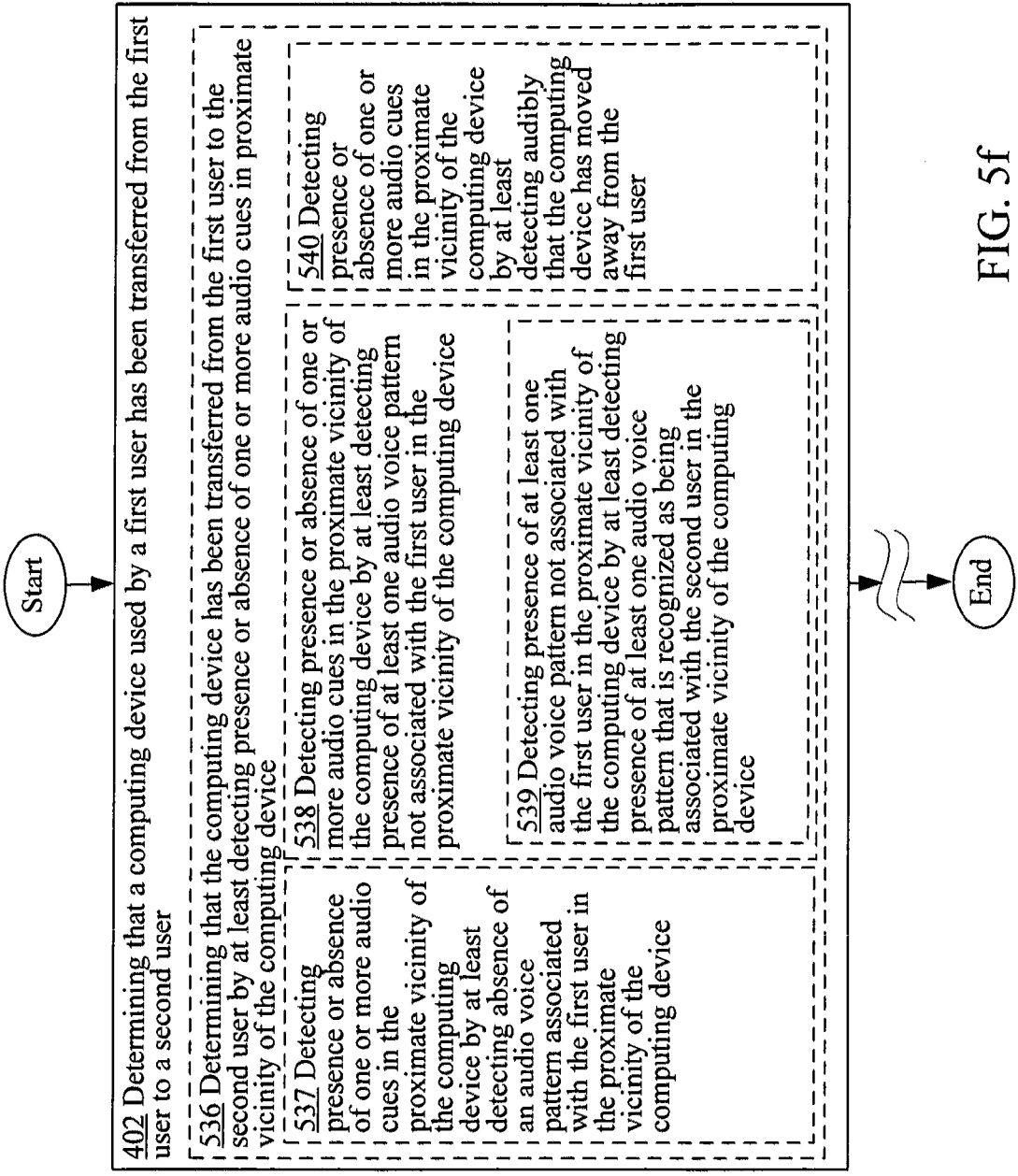
FIG. 5f is a high-level logic flowchart of a process depicting alternate implementations of the transfer determining operation 402 of FIG. 4.

In various implementations, the transfer determining operation 402 of FIG. 4 for determining that a computing device used by a first user has been transferred from the first user to a second user may involve making the transfer determination based on audio cues. For example, and as illustrated in FIG. 5f, in some implementations, the transfer determining operation 402 may include an operation 536 for determining that the computing device has been transferred from the first user to the second user by at least detecting presence or absence of one or more audio cues in proximate vicinity of the computing device. For instance, the transfer determining module 102* including the audio cue detecting module 226 of the computing device 10* determining that the computing device 10* has been transferred from the first user 20 to the second user 30 by the audio cue detecting module 226 at least detecting presence or absence of one or more audio cues (e.g., audio cues associated specifically with the first user 20) in proximate vicinity of the computing device 10*.

As further illustrated in 5f, operation 536 may include one or more additional operations in various alternative implementations. For example, in some implementations, operation 536 may include an operation 537 for detecting presence or absence of one or more audio cues in the proximate vicinity of the computing device by at least detecting absence of an audio voice pattern associated with the first user in the proximate vicinity of the computing device. For instance, the audio cue detecting module 226 including the voice pattern detecting module 227 of the computing device 10* detecting presence or absence of one or more audio cues in the proximate vicinity of the computing device 10* by the voice pattern detecting module 227 at least detecting absence of an audio voice pattern associated with the first user 20 in the proximate vicinity (e.g., within 10 feet or within some other distance from which voice of the first user 20 is at least clearly discernable) of the computing device 10*.

In the same or different implementations, operation 536 may include an operation 538 for detecting presence or absence of one or more audio cues in the proximate vicinity of the computing device by at least detecting presence of at least one audio voice pattern not associated with the first user in the proximate vicinity of the computing device. For instance, the audio cue detecting module 226 including the voice pattern detecting module 227 of the computing device 10* detecting presence or absence of one or more audio cues in the proximate vicinity of the computing device 10* by the voice pattern detecting module 227 at least detecting presence of at least one audio voice pattern not associated with the first user 20 in the proximate vicinity (e.g., within 5 feet or within some other distance from which voice of the second user 30 is at least clearly discernable or identifiable) of the computing device 10*.

As further illustrated in FIG. 5f, in some cases, operation 538 may further include an operation 539 for detecting presence of at least one audio voice pattern not associated with the first user in the proximate vicinity of the computing device by at least detecting presence of at least one audio voice pattern that is recognized as being associated with the second user in the proximate vicinity of the computing device. For instance, the voice pattern detecting module 227 of the computing device 10* detecting presence of at least one audio voice pattern not associated with the first user 20 in the proximate vicinity of the computing device 10* by at least detecting presence of at least one audio voice pattern that is recognized as being associated with the second user 30 in the proximate vicinity of the computing device 10*.

In the same or different implementations, operation 536 may include an operation 540 for detecting presence or absence of one or more audio cues in the proximate vicinity of the computing device by at least detecting audibly that the computing device has moved away from the first user. For instance, the audio cue detecting module 226 including the audio moving away detecting module 228 of the computing device 10* detecting presence or absence of one or more audio cues in the proximate vicinity of the computing device 10* by the audio moving away detecting module 228 at least detecting audibly that the computing device 10* has moved away from the first user 20. For example, the audio moving away detecting module 228 detecting that the volume of an audio cue, such as a voice pattern, that is associated with the first user 20 is diminishing or has diminished, which would be an inference that the computing device 10* may be moving away from the first user 20.

Figure 5G:
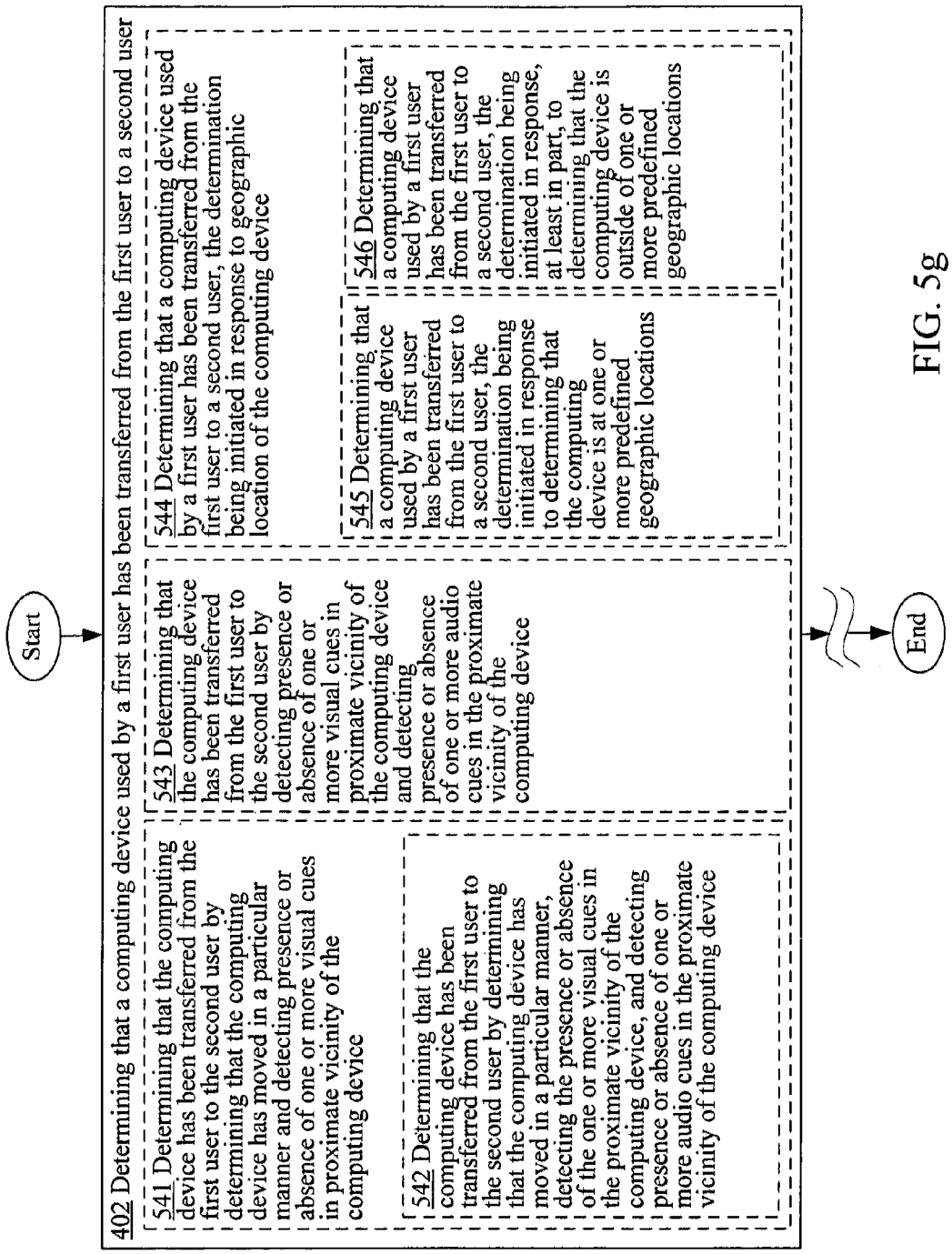
FIG. 5g is a high-level logic flowchart of a process depicting alternate implementations of the transfer determining operation 402 of FIG. 4.

In various implementations, the transfer determining operation 402 of FIG. 4 for determining that a computing device used by a first user has been transferred from the first user to a second user may involve determining the transfer of the computing device 10* based on a combination of detecting direct movements of the computing device 10*, detecting visual cues, and/or detecting audio cues. For example, in some implementations, the transfer determining operation 402 may include an operation 541 for determining that the computing device has been transferred from the first user to the second user by determining that the computing device has moved in a particular manner and detecting presence or absence of one or more visual cues in proximate vicinity of the computing device as illustrated in FIG. 5g. For instance, the transfer detecting module 102* including the particular movement determining module 210 and the visual cue detecting module 220 of the computing device 10* determining that the computing device 10* has been transferred from the first user 20 to the second user 30 when the particular movement determining module 210 determines that the computing device 10* has moved in a particular manner and the visual cue detecting module 220 detects presence or absence of one or more visual cues in proximate vicinity of the computing device 10*.

As further illustrated in FIG. 5g, in some cases, operation 541 may further include an operation 542 for determining that the computing device has been transferred from the first user to the second user by determining that the computing device has moved in a particular manner, detecting the presence or absence of the one or more visual cues in the proximate vicinity of the computing device, and detecting presence or absence of one or more audio cues in the proximate vicinity of the computing device. For instance, the transfer determining module 102* including the particular movement determining module 210, the visual cue detecting module 220, and the audio cue detecting module 226 of the computing device 10* determining that the computing device 10* has been transferred from the first user 20 to the second user 30 when the particular movement determining module 210 determines that the computing device 10* has moved in a particular manner, the visual cue detecting module 220 detects the presence or absence of the one or more visual cues in the proximate vicinity of the computing device 10*, and the audio cue detecting module 226 detects presence or absence of one or more audio cues in the proximate vicinity of the computing device 10*.

In some alternative implementations, the transfer determining operation 402 may include an operation 543 for determining that the computing device has been transferred from the first user to the second user by detecting presence or absence of one or more visual cues in the proximate vicinity of the computing device and detecting presence or absence of one or more audio cues in proximate vicinity of the computing device as further depicted in FIG. 5g. For instance, the transfer detecting module 102* including the visual cue detecting module 220 and the audio cue detecting module 226 of the computing device 10* determining that the computing device 10* has been transferred from the first user 20 to the second user 30 when the visual cue detecting module 220 detects presence or absence of one or more visual cues in the proximate vicinity of the computing device 10* and the audio cue detecting module 226 detects presence or absence of one or more audio cues in proximate vicinity of the computing device 10*.

In various implementations, the transfer determining operation 402 of FIG. 4 may be prompted to be performed in response to occurrence of one or more events. That is, in some cases, it may be desirable to perform the transfer determining operation 402 (as well as the access restricting operation 404) only after occurrence of certain conditions have been detected. For example, in some implementations, the transfer determining operation 402 may include an operation 544 for determining that a computing device used by a first user has been transferred from the first user to a second user, the determination being initiated in response to geographic location of the computing device. For instance, the transfer determining module 102* including the geographic location determination module 230 of the computing device 10* determining that a computing device 10* used by a first user 20 has been transferred from the first user 20 to a second user 30, the determination being initiated in response to geographic location (as determined by the geographic location determination module 230 using, for example, data provided by a GPS 208) of the computing device 10*. For example, whenever the computing device 10* is determined to be located at the home of the first user 20, the transfer determining operation 402 (as well as the access restricting operation 404) may be disabled.

As further illustrated in FIG. 5g, in some implementations, operation 544 may further include an operation 545 for determining that a computing device used by a first user has been transferred from the first user to a second user, the determination being initiated in response to determining that the computing device is at one or more predefined geographic locations. For instance, the transfer determining module 102* including the geographic location determination module 230 of the computing device 10* determining that a computing device 10* used by a first user 20 has been transferred from the first user 20 to a second user 30, the determination being initiated in response to the geographic location determination module 230 using, for example, data provided by a GPS 208 determining that the computing device 10* is at one or more predefined geographic locations.

In some implementations, operation 544 may alternatively include an operation 546 for determining that a computing device used by a first user has been transferred from the first user to a second user, the determination being initiated in response, at least in part, to determining that the computing device is outside of one or more predefined geographic locations. For instance, the transfer determining module 102* including the geographic location determination module 230 of the computing device 10* determining that a computing device 10* used by a first user 20 has been transferred from the first user 20 to a second user 30, the determination being initiated in response, at least in part, to the geographic location determination module 230 determining that the computing device 10* is outside of one or more predefined geographic locations (e.g., home of first user 20).

Figure 6A:
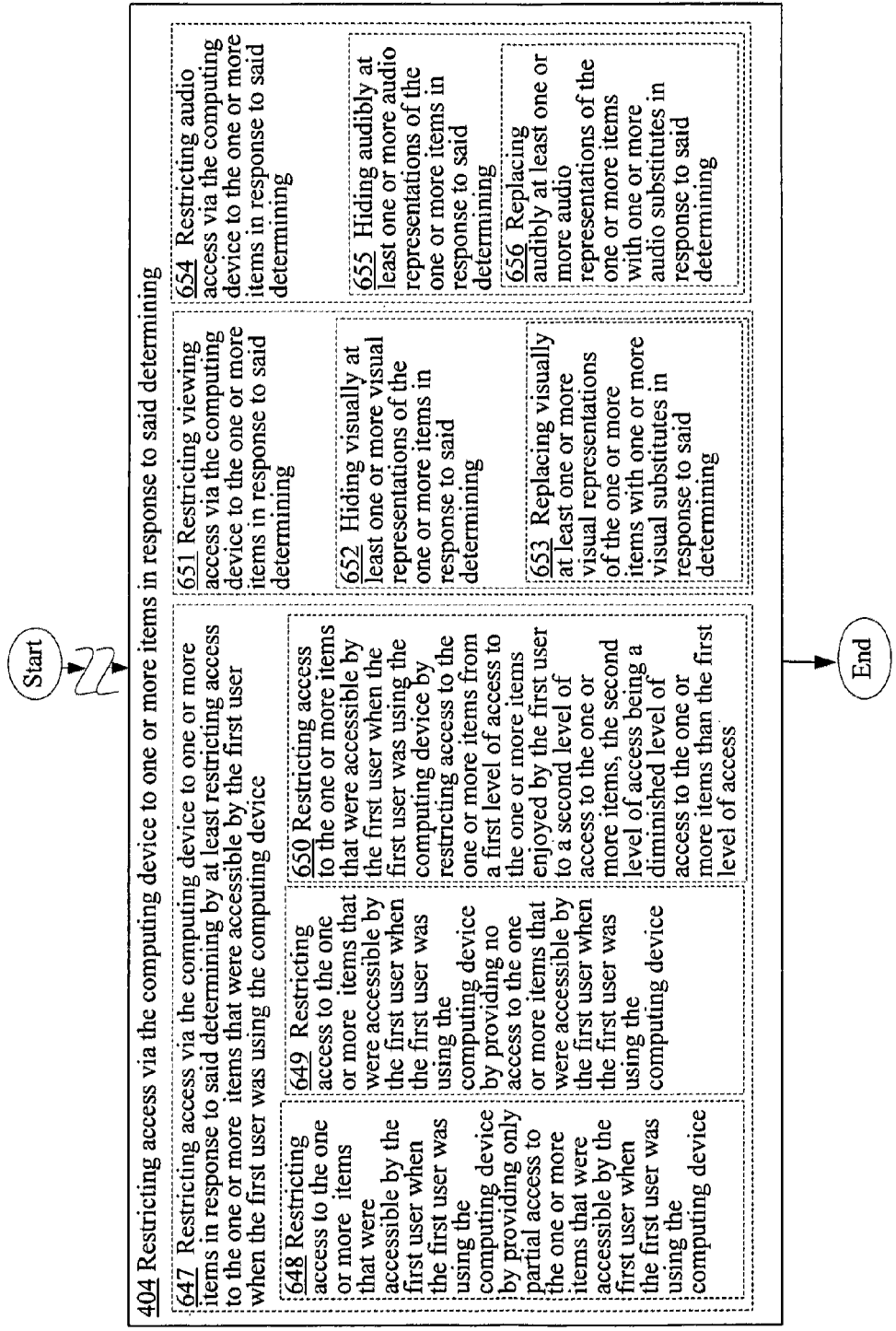
FIG. 6a is a high-level logic flowchart of a process depicting alternate implementations of the access restricting operation 404 of FIG. 4.

Referring back to the access restricting operation 404 of FIG. 4, the access restricting operation 404 similar to the transfer determining operation 402 of FIG. 4 may be executed in a number of different ways in various alternative embodiments as illustrated in FIGS. 6a, 6b, 6c, and 6d. In some implementations, for example, the access restriction operation 404 of FIG. 4 may include an operation 647 for restricting access via the computing device to one or more items in response to said determining by at least restricting access to the one or more items that were accessible by the first user when the first user was using the computing device as depicted in FIG. 6a. For instance, the access restriction module 104* of the computing device 10* restricting access via the computing device 10* to one or more items (e.g., electronic documents including electronic messages and/or productivity documents such as word processing documents, image or audio files, applications, passwords, and so forth) in response to said determining by at least restricting access to the one or more items that were accessible by the first user 20 (e.g., was visible, editable, and/or usable by the first user 20) when the first user 20 was using the computing device 10*.

As further illustrated in FIG. 6a, operation 647 may include one or more additional operations in various alternative implementations. For example, in some implementations, operation 647 may include an operation 648 for restricting access to the one or more items that were accessible by the first user when the first user was using the computing device by providing only partial access to the one or more items that were accessible by the first user when the first user was using the computing device. For instance, the access restricting module 104* including the partial access providing module 232 (see FIG. 2d) of the computing device 10* restricting access to the one or more items that were accessible by the first user 20 when the first user 20 was using the computing device 10* by having the partial access providing module 232 provide only partial access (e.g., read-only access or limited functional access if the one or more items includes one or more applications 160) to the one or more items that were accessible by the first user 20 when the first user 20 was using the computing device 10*.

In some implementations, operation 647 may include an operation 649 for restricting access to the one or more items that were accessible by the first user when the first user was using the computing device by providing no access to the one or more items that were accessible by the first user when the first user was using the computing device. For instance, the access restricting module 104* including the no access module 234 (see FIG. 2d) of the computing device 10* restricting access to the one or more items that were accessible by the first user 20 when the first user 20 was using the computing device 10* by having the no access module 234 provide no access (e.g., completely hiding or erasing any indications of the existence of the one or more items) to the one or more items that were accessible by the first user 20 when the first user 20 was using the computing device 10*.

In some implementations, operation 647 may include an operation 650 for restricting access to the one or more items that were accessible by the first user when the first user was using the computing device by restricting access to the one or more items from a first level of access to the one or more items enjoyed by the first user to a second level of access to the one or more items, the second level of access being a diminished level of access to the one or more items than the first level of access. For instance, the access restricting module 104* of the computing device 10* restricting access to the one or more items that were accessible by the first user 20 when the first user 20 was using the computing device 10* by restricting access to the one or more items from a first level of access to the one or more items enjoyed by the first user 20 to a second level of access to the one or more items, the second level of access being a diminished level of access to the one or more items than the first level of access.

In various implementations, the access restricting operation 404 of FIG. 4 may involve restricting viewing and/or audio access to the one or more items. For example, in some implementations, the access restricting operation 404 may include an operation 651 for restricting viewing access via the computing device to the one or more items in response to said determining as further illustrated in FIG. 6a. For instance, the viewing access restricting module 236 (see FIG. 2d) of the computing device 10* restricting viewing access (e.g., completely cloaking or partially cloaking) via the computing device 10* to the one or more items (e.g., electronic documents such as an email message or a spreadsheet or word processing document, audio or image files, applications, and so forth) in response to said determining.

In some cases operation 651 may include an operation 652 for hiding visually at least one or more visual representations of the one or more items in response to said determining. For instance, the visual hiding module 237 (see FIG. 2d) of the computing device 10* hiding visually (e.g., visually deleting or replacing with substitutes) at least one or more visual representations (e.g., title or subject heading) of the one or more items (e.g., word processing documents or email messages) in response to said determining.

As further depicted in FIG. 6a, in some instances, operation 652 may further include an operation 653 for replacing visually at least one or more visual representations of the one or more items with one or more visual substitutes in response to said determining. For instance, the visual replacing module 238 (see FIG. 2d) of the computing device 10* replacing visually at least one or more visual representations (e.g., titles or file names) of the one or more items (e.g., word processing documents or audio or image files) with one or more visual substitutes (e.g., substitute titles or file names) in response to said determining.

In the same or different implementations, the access restricting operation 404 may additionally or alternatively include an operation 654 for restricting audio access via the computing device to the one or more items in response to said determining as further depicted in FIG. 6a. For instance, the audio access restricting module 240 (see FIG. 2d) of the computing device 10* restricting audio access via the computing device 10* to the one or more items (e.g., voice messages) in response to said determining.

In some implementations, operation 654 may further include an operation 655 for hiding audibly at least one or more audio representations of the one or more items in response to said determining. For instance, the audio hiding module 241 (see FIG. 2d) of the computing device 10* configured to hiding audibly at least one or more audio representations of the one or more items in response to said determining. For example, if the computing device 10*, which may be a mobile communication device, such as a Smartphone, includes one or more voice messages, than not audioally indicating that there are voice messages waiting. Alternatively or additionally, if the one or more items are active in-coming telephone calls and the one or more audio representations are "rings," then preventing the ringing from being generated.

As further depicted in FIG. 6a, in some instances, operation 655 may further include an operation 656 for replacing audibly at least one or more audio representations of the one or more items with one or more audio substitutes in response to said determining. For instance, the audio replacing module 242 (see FIG. 2d) of the computing device 10* replacing audibly at least one or more audio representations (e.g., voice recordings) of the one or more items (e.g., voice messages) with one or more audio substitutes (e.g., fictional voice messages or previously received voice messages) in response to said determining. For example, replacing a voice message from a particular person with a previously received voice message from another person.

Figure 6B:
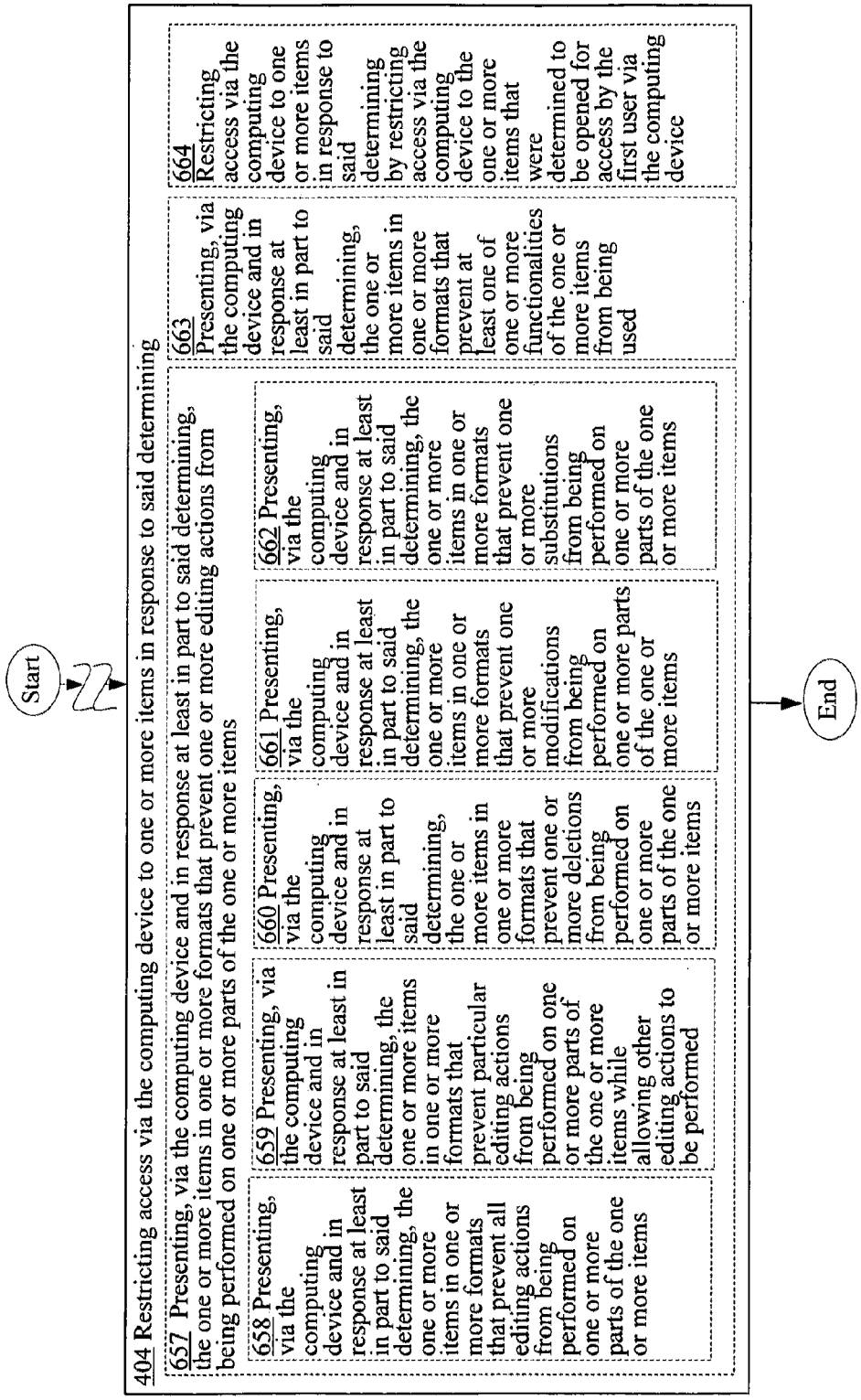
FIG. 6b is a high-level logic flowchart of a process depicting alternate implementations of the access restricting operation 404 of FIG. 4.

In some cases, the access restricting operation 404 of FIG. 4 for restricting access via the computing device to one or more items in response to said determining may involve restricting editorial access to the one or more items. For example, and as illustrated in FIG. 6b, in various implementations, the access restricting operation 404 may include an operation 657 for presenting, via the computing device and in response at least in part to said determining, the one or more items in one or more formats that prevent one or more editing actions from being performed on one or more parts of the one or more items. For instance, the editorial restricted format presenting module 245 (see FIG. 2d) of the computing device 10* presenting, via the computing device 10* and in response at least in part to said determining, the one or more items (e.g., word processing documents and/or spreadsheet documents) in one or more formats that prevent one or more editing actions from being performed on one or more parts of the one or more items. For example, if the one or more items are one or more word processing documents or spreadsheet documents, than the editorial restricted format presenting module 245 may interface with a corresponding word processing application or a corresponding spreadsheet application in order to disable editorial functionalities to limit or prevent editing of the word processing documents or the spreadsheet documents.

As further illustrated in FIG. 6b, operation 657 may include one or more additional operations in various alternative implementations. For example, in some implementations, operation 657 may include an operation 658 for presenting, via the computing device and in response at least in part to said determining, the one or more items in one or more formats that prevent all editing actions from being performed on one or more parts of the one or more items. For instance, the editorial restricted format presenting module 245 of the computing device 10* presenting, via the computing device 10* and in response at least in part to said determining, the one or more items (e.g., one or more word processing documents) in one or more formats (e.g., read-only format) that prevent all editing actions from being performed on one or more parts of the one or more items.

In some implementations, operation 657 may include an operation 659 for presenting, via the computing device and in response at least in part to said determining, the one or more items in one or more formats that prevent particular editing actions from being performed on one or more parts of the one or more items while allowing other editing actions to be performed. For instance, the editorial restricted format presenting module 245 of the computing device 10* presenting, via the computing device 10* and in response at least in part to said determining, the one or more items in one or more formats that prevent particular editing actions (e.g., deletions) from being performed on one or more parts of the one or more items while allowing other editing actions (e.g., modifications or substitutions) to be performed.

In the same or different implementations, operation 657 may include an operation 660 for presenting, via the computing device and in response at least in part to said determining, the one or more items in one or more formats that prevent one or more deletions from being performed on one or more parts of the one or more items. For instance, the editorial restricted format presenting module 245 of the computing device 10* presenting, via the computing device 10* and in response at least in part to said determining, the one or more items (e.g., one or more image files, audio files, word processing documents, presentation documents, textual messages such as emails, and so forth) in one or more formats (e.g., as a PDF file) that prevent one or more deletions from being performed on one or more parts of the one or more items.

In the same or different implementations, operation 657 may include an operation 661 for presenting, via the computing device and in response at least in part to said determining, the one or more items in one or more formats that prevent one or more modifications from being performed on one or more parts of the one or more items. For instance, the editorial restricted format presenting module 245 of the computing device 10\* presenting, via the computing device 10\* and in response at least in part to said determining, the one or more items (e.g., word processing document) in one or more formats that prevent one or more modifications from being performed on one or more parts of the one or more items.

In some implementations, operational flow 657 may include an operation 662 for presenting, via the computing device and in response at least in part to said determining, the one or more items in one or more formats that prevent one or more substitutions from being performed on one or more parts of the one or more items depicted in FIG. 6b. For instance, the editorial restricted format presenting module 245 of the computing device 10\* presenting, via the computing device 10\* and in response at least in part to said determining, the one or more items in one or more formats that prevent one or more substitutions from being performed on one or more parts of the one or more items.

In various implementations, the access restricting operation 404 of FIG. 4 may include an operation 663 for presenting, via the computing device and in response at least in part to said determining, the one or more items in one or more formats that prevent at least one of one or more functionalities of the one or more items from being used as further depicted in FIG. 6b. For instance, the functional restricting format presenting module 250 of the computing device 10 presenting, via the computing device 10\* and in response at least in part to said determining, the one or more items in one or more formats that prevent at least one of one or more functionalities of the one or more items (e.g., applications) from being used.

As further illustrated in FIG. 6b, in some implementations, the access restricting operation 404 of FIG. 4 may additionally or alternatively include an operation 664 for restricting access via the computing device to one or more items in response to said determining by restricting access via the computing device to the one or more items that were determined to be opened for access by the first user via the computing device. For instance, the access restricting module 104\* including the open item ascertaining module 252 (see FIG. 2d) of the computing device 10\* restricting access via the computing device 10\* to one or more items in response to said determining by restricting access via the computing device 10\* to the one or more items that were determined by the open item ascertaining module 252 to be opened (e.g., running) for access by the first user 20 via the computing device 10\*.

Figure 6C:
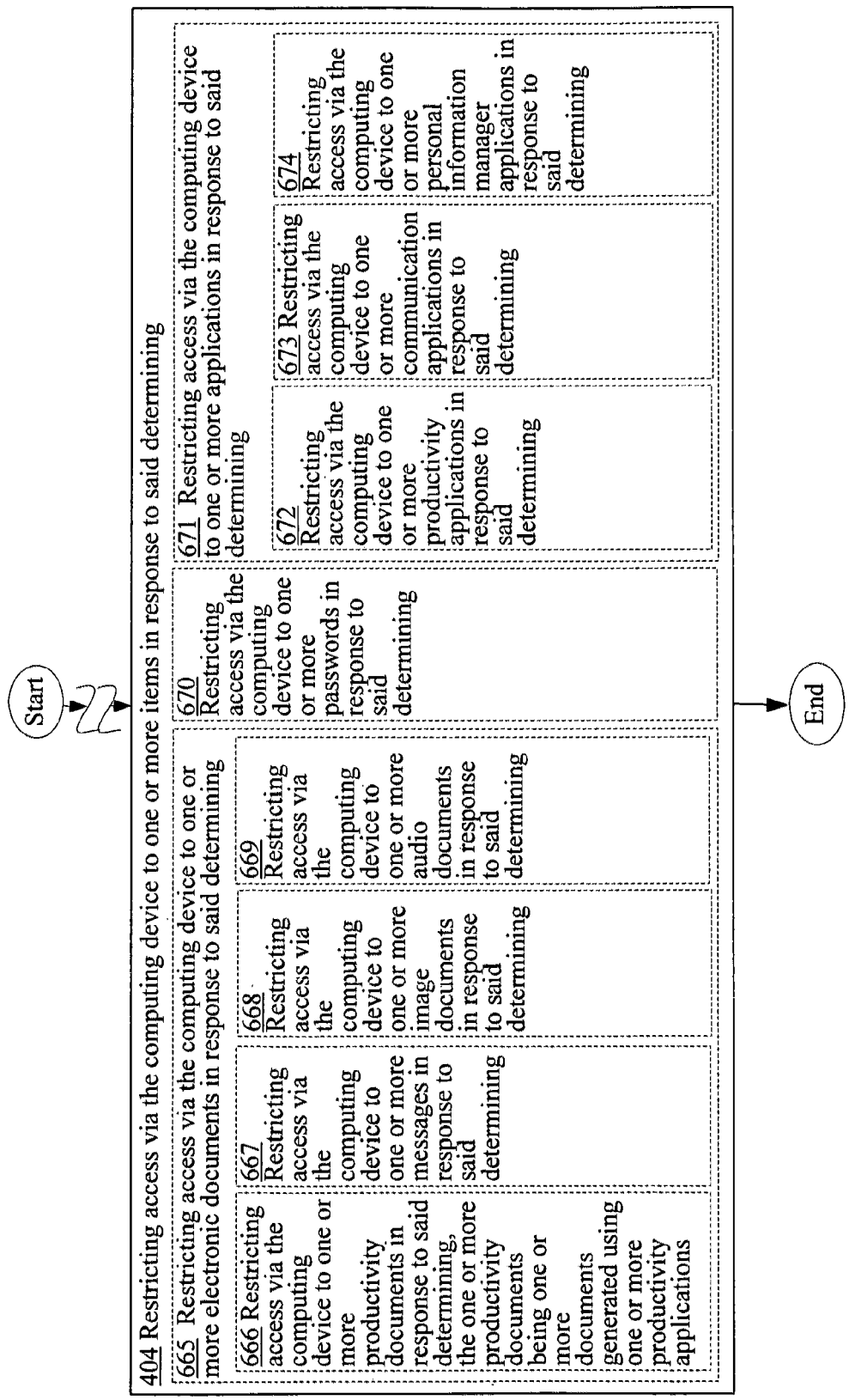
FIG. 6c is a high-level logic flowchart of a process depicting alternate implementations of the access restricting operation 404 of FIG. 4.

In various implementations, the one or more items referenced in the access restricting operation 404 of FIG. 4 may be a variety of electronic files, documents, applications, and so forth that may be accessed through the computing device 10\*. For example, in some cases, the access restricting operation 404 may include an operation 665 for restricting access via the computing device to one or more electronic documents in response to said determining as illustrated in FIG. 6c. For instance, the document access restricting module 254 (see FIG. 2d) of the computing device 10\* restricting access (e.g., hiding or presenting in a format that restricts access) via the computing device 10\* to one or more electronic documents (e.g., word processing document, spreadsheet document, email message, audio file, and so forth) in response to said determining.

As further illustrated in FIG. 6c, the one or more electronic documents that access is restricted to in operation 665 may be in reference to any one or more of a variety of electronic documents that may have been accessible through the computing device 10\* when the computing device 10\* was being used by (e.g., in the possession of) the first user 20. For example, in some implementations, operation 665 may include an operation 666 for restricting access via the computing device to one or more productivity documents in response to said determining, the one or more productivity documents being one or more documents generated using one or more productivity applications. For instance, the document access restricting module 254 of the computing device 10\* restricting (e.g., hiding or disguising or presenting in a format that restricts editorial access) access via the computing device 10\* to one or more productivity documents (.g., one or more of word processing documents, spreadsheet documents, presentation documents, and so forth) in response to said determining, the one or more productivity documents being one or more documents generated using one or more productivity applications.

In the same or different implementations, operation 665 may include an operation 667 for restricting access via the computing device to one or more messages in response to said determining. For instance, the message access restricting module 256 (see FIG. 2d) of the computing device 10\* restricting access via the computing device 10\* to one or more messages (e.g., email messages or voice messages) in response to said determining. For example, one way to restrict access to an email message that may have been accessible while the first user 20 was using the computing device 10\* is to delete any indication, such as a subject heading, that indicates the existence of the email message from a listing of email messages.

In the same or different implementations, operation 665 may include an operation 668 for restricting access via the computing device to one or more image documents in response to said determining. For instance, the image document access restricting module 257 (see FIG. 2d) of the computing device 10\* restricting access via the computing device 10\* to one or more image documents (e.g., digital photos, video clips, etc.) in response to said determining. For example, one way to restrict access to an image document such as a photo that may have been accessible while the first user 20 was using the computing device 10\* is to hide (e.g., delete) any indication, such as a photo title or even the photo itself, that may have been displayed through a directory or listing when the first user 20 was using the computing device 10\*.

In the same or different implementations, operation 665 may include an operation 669 for restricting access via the computing device to one or more audio documents in response to said determining. For instance, the audio document access restricting module 258 (see FIG. 2d) of the computing device 10\* restricting access via the computing device 10\* to one or more audio documents (e.g., audio files including voice messages) in response to said determining.

In some implementations, the access restricting operation 404 of FIG. 4 may include an operation 670 for restricting access via the computing device to one or more passwords in response to said determining as illustrated in FIG. 6c. For instance, the password access restricting module 262 (see FIG. 2d) of the computing device 10\* restricting access via the computing device 10* to one or more passwords (email account passwords) in response to said determining.

As further illustrated in FIG. 6c, in some implementations, the access restricting operation 404 may include an operation 671 for restricting access via the computing device to one or more applications in response to said determining. For instance, the application access restriction module 264 (see FIG. 2d) of the computing device 10* restricting access via the computing device 10* to one or more applications 160 (e.g., a productivity application such as a word processing application, a communication application such as an IM application, a gaming application, and so forth) in response to said determining. In some cases, such restrictions to one or more applications 160 may be related to restricting use of one or more functionalities of the one or more applications 160.

In some implementations, and as also illustrated in FIG. 6c, operation 671 may include an operation 672 for restricting access via the computing device to one or more productivity applications in response to said determining. For instance, the productivity application access restriction module 265 (see FIG. 2d) of the computing device 10* restricting access via the computing device 10* to one or more productivity applications (e.g., one or more of a word processing applications, spreadsheet applications, presentation applications, diagramming applications, and so forth) in response to said determining.

In the same or different implementations, operation 671 may include an operation 673 for restricting access via the computing device to one or more communication applications in response to said determining. For instance, the communication application access restriction module 266 (see FIG. 2d) of the computing device 10* restricting access via the computing device 10* to one or more communication applications (e.g., email application, instant messaging or IM application, text messaging application, and so forth) in response to said determining.

In the same or different implementations, operation 671 may include an operation 674 for restricting access via the computing device to one or more personal information manager applications in response to said determining. For instance, the personal information manager application access restriction module 267 (see FIG. 2d) of the computing device 10* restricting access via the computing device 10* to one or more personal information manager applications (e.g., Microsoft Outlook) in response to said determining.

Figure 6D:
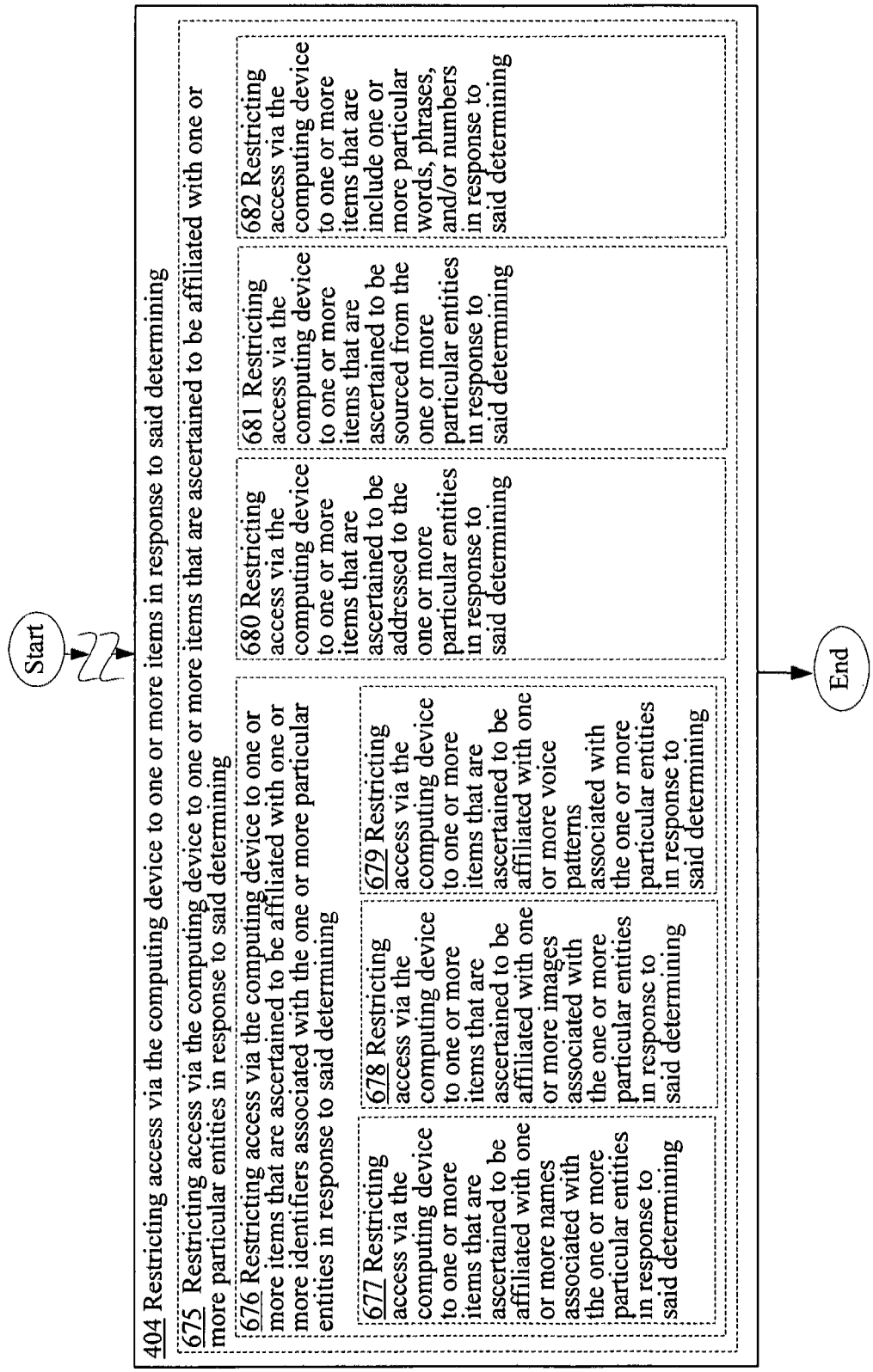
FIG. 6d is a high-level logic flowchart of a process depicting alternate implementations of the access restricting operation 404 of FIG. 4.

Referring now to FIG. 6d, in various implementations, the access restricting operation 404 of FIG. 4 may involve restricting access to certain items that have been determined to be affiliated with one or more entities. For example, in various implementations, the access restricting operation 404 may include an operation 675 for restricting access via the computing device to one or more items that are ascertained to be affiliated with one or more particular entities in response to said determining. For instance, the access restricting module 104* including the affiliation ascertaining module 270 (see FIG. 2d) of the computing device 10* restricting access via the computing device 10* to one or more items that are ascertained by the affiliation ascertaining module 270 to be affiliated with one or more particular entities (e.g., one or more third parties that the first user 20 wishes to keep confidential) in response to said determining.

As further illustrated in FIG. 6d, operation 675 may include one or more additional operations in various alternative implementations. For example, in various implementations, operation 675 may include an operation 676 for restricting access via the computing device to one or more items that are ascertained to be affiliated with one or more identifiers associated with the one or more particular entities in response to said determining. For instance, the access restricting module 104* including the identifier affiliation ascertaining module 271 (see FIG. 2d) of the computing device 10* restricting access via the computing device 10* to one or more items that are ascertained by the identifier affiliation ascertaining module 271 to be affiliated with one or more identifiers (e.g., names, telephone numbers, images, audio signatures, and so forth) associated with the one or more particular entities in response to said determining.

In some implementations, operation 676 may include an operation 677 for restricting access via the computing device to one or more items that are ascertained to be affiliated with one or more names associated with the one or more particular entities in response to said determining as further depicted in FIG. 6d. For instance, the access restricting module 104* including the name affiliation ascertaining module 272 (see FIG. 2d) of the computing device 10* restricting access via the computing device 10* to one or more items that are ascertained by the name affiliation ascertaining module 272 to be affiliated with one or more names (e.g., legal names, usernames, business names, etc.) associated with the one or more particular entities in response to said determining.

In the same or different implementations, operation 676 may alternatively or additionally include an operation 678 for restricting access via the computing device to one or more items that are ascertained to be affiliated with one or more images associated with the one or more particular entities in response to said determining. For instance, the access restricting module 104* including the image affiliation ascertaining module 273 (see FIG. 2d) of the computing device 10* restricting access via the computing device 10* to one or more items (e.g., digital photos) that are ascertained by the image affiliation ascertaining module 273 to be affiliated with one or more images (e.g., facial images) associated with the one or more particular entities in response to said determining.

In the same or different implementations, operation 676 may alternatively or additionally include an operation 679 for restricting access via the computing device to one or more items that are ascertained to be affiliated with one or more voice patterns associated with the one or more particular entities in response to said determining. For instance, the access restricting module 104* including the voice pattern affiliation ascertaining module 274 (see FIG. 2d) of the computing device 10* restricting access via the computing device 10* to one or more items (e.g., voice messages) that are ascertained by the voice pattern affiliation ascertaining module 274 to be affiliated with one or more voice patterns associated with the one or more particular entities in response to said determining.

In various implementations, operation 675 for restricting access via the computing device to one or more items that are ascertained to be affiliated with one or more particular entities in response to said determining may include an operation 680 for for restricting access via the computing device to one or more items that are ascertained to be addressed to the one or more particular entities in response to said determining. For instance, the access restricting module 104* including the address ascertaining module 276 (see FIG. 2d) of the computing device 10* restricting access via the computing device 10* to one or more items that are ascertained by the address ascertaining module 276 to be addressed to (e.g., directed or being sent to) the one or more particular entities in response to said determining.

In the same or different implementations, operation 675 may additionally or alternatively include an operation 681 for for restricting access via the computing device to one or more items that are ascertained to be sourced from the one or more particular entities in response to said determining. For instance, the access restricting module 104* including the source ascertaining module 277 (see FIG. 2*d*) of the computing device 10* restricting access via the computing device 10* to one or more items (e.g., an email or a voice message, or documents authored by the one or more particular entities) that are ascertained by the source ascertaining module 277 to be sourced (e.g., originate) from the one or more particular entities in response to said determining.

In the same or different implementations, operation 675 may additionally or alternatively include an operation 682 for for restricting access via the computing device to one or more items that are ascertained to include one or more particular words, phrases, and/or numbers in response to said determining. For instance, the access restricting module 104* including the word/phrase/number affiliation ascertaining module 278 (see FIG. 2*d*) of the computing device 10* restricting access via the computing device 10* to one or more items that are ascertained by the word/phrase/number affiliation ascertaining module 278 to include one or more particular words, phrases, and/or numbers in response to said determining.

Figure 7:
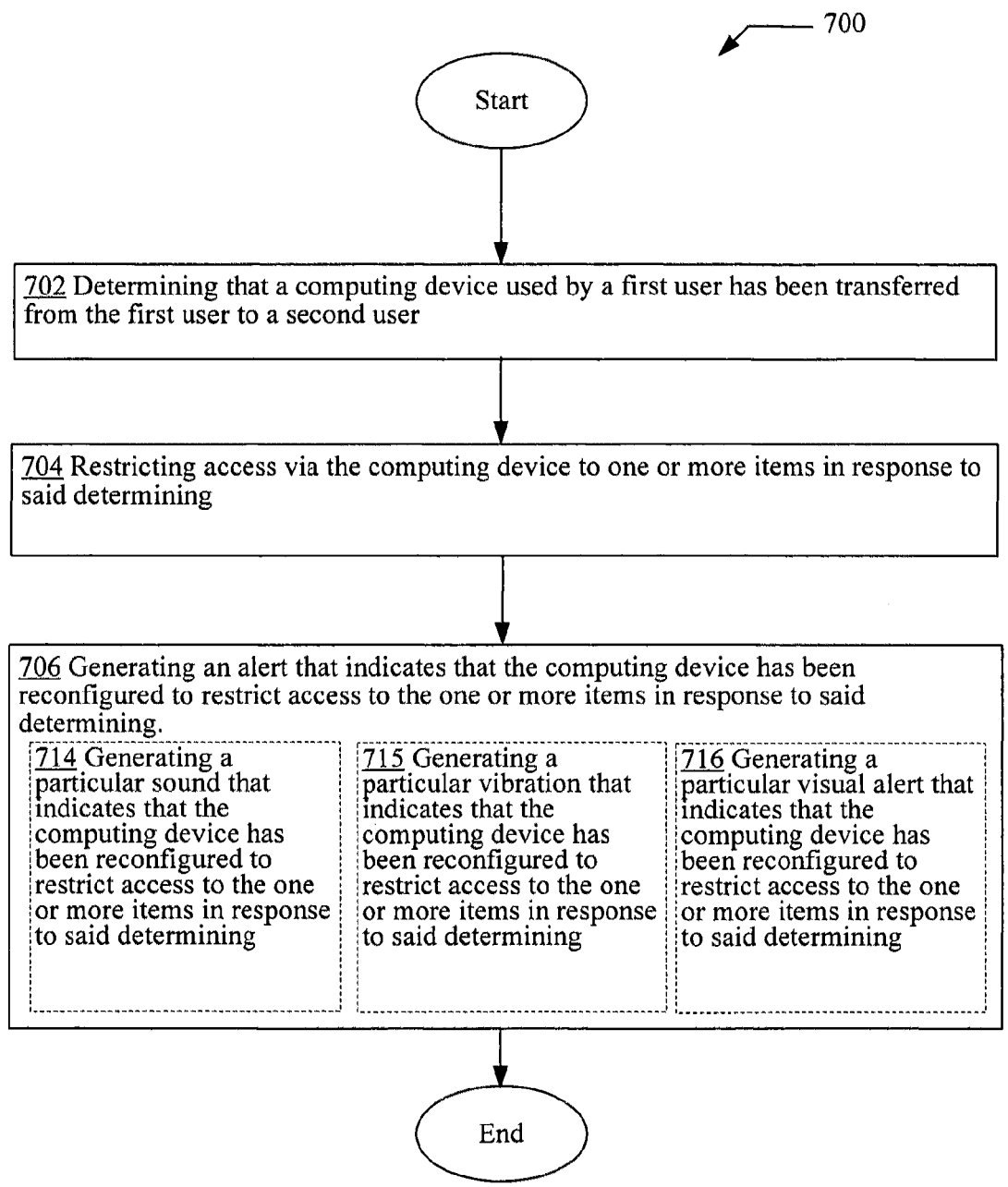
FIG. 7 is another high-level logic flowchart of another process.

Turning now to FIG. 7 illustrating another operational flow 700. Operational flow 700 includes certain operations that mirror the operations included in operational flow 400 of FIG. 4. These operations include a transfer determining operation 702 and an access restricting operation 704 that corresponds to and mirror the transfer determining operation 402 and the access restricting operation 404, respectively, of FIG. 4.

In addition, operational flow 700 may include an alert generating operation 706 for generating an alert that indicates that the computing device has been reconfigured to restrict access to the one or more items in response to said determining as depicted in FIG. 7. For instance, the alert generating module 106* (see FIGS. 2*a* and 2*b*) of the computing device 10* generating an alert (e.g., via the user interface 110) that indicates that the computing device 10* has been reconfigured to restrict access to the one or more items in response to said determining.

As further illustrated in FIG. 7, in some implementations, the alert generating operation 706 may include an operation 714 for generating a particular sound that indicates that the computing device has been reconfigured to restrict access to the one or more items in response to said determining. For instance, the sound generating module 280 (see FIG. 2*e*) of the computing device 10 generating (e.g., via user interface 110, which may include one or more speakers) a particular sound that indicates that the computing device 10* has been reconfigured to restrict access to the one or more items in response to said determining.

In the same or different implementations, the alert generating operation 706 may include an operation 715 for generating a particular vibration that indicates that the computing device has been reconfigured to restrict access to the one or more items in response to said determining. For instance, the vibration generating module 282 (see FIG. 2*e*) of the computing device 10* generating (via the user interface 110, which may include a vibration generator in the form of a miniature motor) a particular vibration that indicates that the computing device 10* has been reconfigured to restrict access to the one or more items in response to said determining.

In the same or different implementations, the alert generating operation 706 may include an operation 716 for generating a particular visual alert that indicates that the computing device has been reconfigured to restrict access to the one or more items in response to said determining. For instance, the visual alert generating module 284 (see FIG. 2*e*) of the computing device 10* generating (e.g., via the user interface 110, which may include a display monitor) a particular visual alert that indicates that the computing device 10* has been reconfigured to restrict access to the one or more items in response to said determining.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system at least partially implemented using hardware, comprising:
   (i) means for determining that a computing device used by a first user has been transferred from the first user to a second user at least in part by the first user exhibiting one or more gestures with the computing device to at least one of hand or pass the device to the second user, the means for determining configured to perform the determining based at least in part on a detection that the computing device has moved in a particular manner, including at least:
      (A) means for determining that the first user has exhibited one or more arm and hand gestures that include at least the first user extending one or both arms while holding the computing device in one or both hands toward the second user; and
   (ii) means for restricting access via the computing device, the means for restricting responsive at least in part to the means for determining that a computing device used by a first user has been transferred from the first user to a second user at least in part by the first user exhibiting one or more gestures with the computing device to at least one of hand or pass the device to the second user, the means for determining configured to perform the determining based at least in part on a detection that the computing device has moved in a particular manner.

2. A computationally-implemented system, comprising:
   (i) circuitry for determining that a computing device used by a first user has been transferred from the first user to a second user at least in part by the first user exhibiting one or more gestures with the computing device to at least one of hand or pass the device to the second user, the circuitry for determining configured to perform the determining based at least in part on a detection that the computing device has moved in a particular manner, including at least:
      (A) circuitry for determining that the first user has exhibited one or more arm and hand gestures that include at least the first user extending one or both arms while holding the computing device in one or both hands toward the second user; and
   (ii) circuitry for restricting access via the computing device, the circuitry for restricting responsive at least in part to the circuitry for determining that a computing device used by a first user has been transferred from the first user to a second user at least in part by the first user exhibiting one or more gestures with the computing device to at least one of hand or pass the device to the second user, the circuitry for determining configured to perform the determining based at least in part on a detection that the computing device has moved in a particular manner.

3. A computationally-implemented method, comprising:
   determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner, including at least:
      determining that the first user has exhibited one or more arm and hand gestures that include at least the first user extending one or both arms while holding the computing device in one or both hands toward the second user; and
   restricting access via the computing device to one or more items in response to said determining; and
   wherein at least one of the determining that a computing device used by a first user has been transferred from the first user to a second user or the restricting access is performed at least in part with one or more processing devices.

4. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:
   determining automatically and without interference by the first user or the second user that the computing device has been transferred from the first user to the second user.

5. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:
   determining that the computing device has been transferred from the first user to the second user by at least determining that the computing device has moved in a particular manner, the determining including at least comparing the movement of the computing device in the particular manner with at least one or more catalogued movements stored in one or more movement libraries.

6. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:
   determining that the computing device has moved in a particular manner by at least detecting that the computing device is no longer in a particular tilt orientation that the computing device was detected in during use of the computing device by the first user.

7. The computationally-implemented method of claim 6, wherein said determining that the computing device has moved in a particular manner by at least detecting that the computing device is no longer in a particular tilt orientation that the computing device was detected in during use of the computing device by the first user comprises:
   detecting that the computing device is no longer in a particular tilt orientation that the computing device was detected in during use of the computing device by the first user by at least detecting that the computing device has been reoriented from the particular tilt orientation to another tilt orientation.

8. The computationally-implemented method of claim 6, wherein said determining that the computing device has moved in a particular manner by at least detecting that the computing device is no longer in a particular tilt orientation that the computing device was detected in during use of the computing device by the first user comprises:

detecting that the computing device is no longer in a particular tilt orientation that the computing device was detected in during use of the computing device by the first user by at least detecting that the computing device has been reoriented from the particular tilt orientation to another tilt orientation having an angular tilt that is at least a predefined percentage different from an angular tilt associated with the particular tilt orientation that the computing device was detected as being in during use of the computing device by the first user.

9. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:

determining that the computing device has moved in a particular manner by at least detecting that the computing device is no longer at a particular spatial location that the computing device was detected as being located at during use of the computing device by the first user.

10. The computationally-implemented method of claim 9, wherein said determining that the computing device has moved in a particular manner by at least detecting that the computing device is no longer at a particular spatial location that the computing device was detected as being located at during use of the computing device by the first user comprises:

detecting that the computing device is no longer at a particular spatial location that the computing device was detected as being located at during use of the computing device by the first user by at least detecting that the computing device has been relocated from the particular spatial location to another spatial location that is at least a predefined distance away from the particular spatial location that the computing device was detected as being located at during use of the computing device by the first user.

11. The computationally-implemented method of claim 9, wherein said determining that the computing device has moved in a particular manner by at least detecting that the computing device is no longer at a particular spatial location that the computing device was detected as being located at during use of the computing device by the first user comprises:

detecting that the computing device is no longer at a particular spatial location that the computing device was detected as being located at during use of the computing device by the first user by at least detecting that the computing device has been relocated from the particular spatial location to another spatial location.

12. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:

determining that the computing device has moved in a particular manner by at least detecting that the computing device has been spin rotated from a first orientation associated with the computing device during use of the computing device by the first user to a second orientation.

13. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:

determining that the computing device has moved in a particular manner by at least detecting that the computing device has moved away from the first user.

14. The computationally-implemented method of claim 13, wherein said determining that the computing device has moved in a particular manner by at least detecting that the computing device has moved away from the first user comprises:

detecting that the computing device has moved away from the first user by at least detecting that the computing device has moved a predefined distance away from the first user.

15. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:

determining that the computing device has moved in a particular manner by at least detecting that the computing device is no longer vibrating in a manner that matches with a vibration pattern that the computing device was detected having during use of the computing device by the first user.

16. The computationally-implemented method of claim 15 wherein said determining that the computing device has moved in a particular manner by at least detecting that the computing device is no longer vibrating in a manner that matches with a vibration pattern that the computing device was detected having during use of the computing device by the first user comprises:

detecting that the computing device is no longer vibrating in a manner that matches with a vibration pattern that the computing device was detected having during use of the computing device by the first user by at least detecting that the computing device is vibrating in a manner that matches with a vibration pattern associated with the second user.

17. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:

determining that the computing device has moved in a particular manner by at least detecting that the computing device is not vibrating in a manner that matches with a vibration pattern that is associated with the first user.

18. The computationally-implemented method of claim 5, wherein said determining that the computing device has been transferred from the first user to the second user by at least determining that the computing device has moved in a particular manner, the determining including at least comparing the movement of the computing device in the particular manner with at least one or more catalogued movements stored in one or more movement libraries comprises:
   determining that the computing device has moved in a particular manner by at least detecting that the computing device has moved in a particular three-dimensional movement.

19. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:
   determining that the computing device has been transferred from the first user to the second user by at least detecting presence or absence of one or more visual cues in proximate vicinity of the computing device.

20. The computationally-implemented method of claim 19, wherein said determining that the computing device has been transferred from the first user to the second user by at least detecting presence or absence of one or more visual cues in proximate vicinity of the computing device comprises:
   detecting presence or absence of one or more visual cues in the proximate vicinity of the computing device by detecting at least a change in lighting in the proximate vicinity of the computing device.

21. The computationally-implemented method of claim 20, wherein said detecting presence or absence of one or more visual cues in the proximate vicinity of the computing device by detecting at least a change in lighting in the proximate vicinity of the computing device comprises:
   detecting at least a change in lighting in the proximate vicinity of the computing device by detecting at least a predefined amount of change in lighting in the proximate vicinity of the computing device within a predefined time period.

22. The computationally-implemented method of claim 19, wherein said determining that the computing device has been transferred from the first user to the second user by at least detecting presence or absence of one or more visual cues in proximate vicinity of the computing device comprises:
   determining that the computing device has been transferred from the first user to the second user by at least detecting presence of at least one face in the proximate vicinity of the computing device not associated with the first user.

23. The computationally-implemented method of claim 22, wherein said determining that the computing device has been transferred from the first user to the second user by at least detecting presence of at least one face in the proximate vicinity of the computing device not associated with the first user comprises:
   detecting presence of at least one face in the proximate vicinity of the computing device not associated with the first user by at least detecting presence of at least one face in the proximate vicinity of the computing device that is recognized as being associated with the second user.

24. The computationally-implemented method of claim 19, wherein said determining that the computing device has been transferred from the first user to the second user by at least detecting presence or absence of one or more visual cues in proximate vicinity of the computing device comprises:
   detecting presence or absence of one or more visual cues in the proximate vicinity of the computing device by at least detecting presence of a first face associated with the first user and a second face associated with the second user in the proximate vicinity of the computing device, the second face being detected as being closer to the computing device than the first face.

25. The computationally-implemented method of claim 19, wherein said determining that the computing device has been transferred from the first user to the second user by at least detecting presence or absence of one or more visual cues in proximate vicinity of the computing device comprises:
   detecting presence or absence of one or more visual cues in the proximate vicinity of the computing device by detecting presence of at least one eyeball in the proximate vicinity of the computing device not associated with the first user.

26. The computationally-implemented method of claim 19, wherein said determining that the computing device has been transferred from the first user to the second user by at least detecting presence or absence of one or more visual cues in proximate vicinity of the computing device comprises:
   detecting presence or absence of one or more visual cues in the proximate vicinity of the computing device by at least detecting absence of a visual cue associated with the first user in the proximate vicinity of the computing device.

27. The computationally-implemented method of claim 26, wherein said detecting presence or absence of one or more visual cues in the proximate vicinity of the computing device by at least detecting absence of a visual cue associated with the first user in the proximate vicinity of the computing device comprises:
   detecting absence of a visual cue associated with the first user in the proximate vicinity of the computing device by at least detecting absence of a face associated with the first user in the proximate vicinity of the computing device.

28. The computationally-implemented method of claim 26, wherein said detecting presence or absence of one or more visual cues in the proximate vicinity of the computing device by at least detecting absence of a visual cue associated with the first user in the proximate vicinity of the computing device comprises:
   detecting absence of a visual cue associated with the first user in the proximate vicinity of the computing device by at least detecting absence of one or more eyeballs associated with the first user in the proximate vicinity of the computing device.

29. The computationally-implemented method of claim 19, wherein said determining that the computing device has been transferred from the first user to the second user by at least detecting presence or absence of one or more visual cues in proximate vicinity of the computing device comprises:
   detecting presence or absence of one or more visual cues in the proximate vicinity of the computing device by at least detecting visually that the computing device has moved away from the first user.

30. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:

determining that the computing device has been transferred from the first user to the second user by at least detecting presence or absence of one or more audio cues in proximate vicinity of the computing device.

31. The computationally-implemented method of claim 30, wherein said determining that the computing device has been transferred from the first user to the second user by at least detecting presence or absence of one or more audio cues in proximate vicinity of the computing device comprises:

detecting presence or absence of one or more audio cues in the proximate vicinity of the computing device by at least detecting presence of at least one audio voice pattern not associated with the first user in the proximate vicinity of the computing device.

32. The computationally-implemented method of claim 31, wherein said detecting presence or absence of one or more audio cues in the proximate vicinity of the computing device by at least detecting presence of at least one audio voice pattern not associated with the first user in the proximate vicinity of the computing device comprises:

detecting presence of at least one audio voice pattern not associated with the first user in the proximate vicinity of the computing device by at least detecting presence of at least one audio voice pattern that is recognized as being associated with the second user in the proximate vicinity of the computing device.

33. The computationally-implemented method of claim 30, wherein said determining that the computing device has been transferred from the first user to the second user by at least detecting presence or absence of one or more audio cues in proximate vicinity of the computing device comprises:

detecting presence or absence of one or more audio cues in the proximate vicinity of the computing device by at least detecting audibly that the computing device has moved away from the first user.

34. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:

determining that the computing device has been transferred from the first user to the second user by determining that the computing device has moved in a particular manner and detecting presence or absence of one or more visual cues in proximate vicinity of the computing device.

35. The computationally-implemented method of claim 34, wherein said determining that the computing device has been transferred from the first user to the second user by determining that the computing device has moved in a particular manner and detecting presence or absence of one or more visual cues in proximate vicinity of the computing device comprises:

determining that the computing device has been transferred from the first user to the second user by determining that the computing device has moved in a particular manner, detecting the presence or absence of the one or more visual cues in the proximate vicinity of the computing device, and detecting presence or absence of one or more audio cues in the proximate vicinity of the computing device.

36. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:

determining that the computing device has been transferred from the first user to the second user by detecting presence or absence of one or more visual cues in the proximate vicinity of the computing device and detecting presence or absence of one or more audio cues in proximate vicinity of the computing device.

37. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:

determining that a computing device used by a first user has been transferred from the first user to a second user, the determination being initiated in response to geographic location of the computing device.

38. The computationally-implemented method of claim 3, wherein said restricting access via the computing device to one or more items in response to said determining comprises:

restricting access via the computing device to one or more items in response to said determining by at least restricting access to the one or more items that were accessible by the first user when the first user was using the computing device.

39. The computationally-implemented method of claim 38, wherein said restricting access via the computing device to one or more items in response to said determining by at least restricting access to the one or more items that were accessible by the first user when the first user was using the computing device comprises:

restricting access to the one or more items that were accessible by the first user when the first user was using the computing device by providing only partial access to the one or more items that were accessible by the first user when the first user was using the computing device.

40. The computationally-implemented method of claim 38, wherein said restricting access via the computing device to one or more items in response to said determining by at least restricting access to the one or more items that were accessible by the first user when the first user was using the computing device comprises:

restricting access to the one or more items that were accessible by the first user when the first user was using the computing device by providing no access to the one or more items that were accessible by the first user when the first user was using the computing device.

41. The computationally-implemented method of claim 3, wherein said restricting access via the computing device to one or more items in response to said determining comprises:

restricting viewing access via the computing device to the one or more items in response to said determining.

42. The computationally-implemented method of claim 3, wherein said restricting access via the computing device to one or more items in response to said determining comprises:

restricting audio access via the computing device to the one or more items in response to said determining.

43. The computationally-implemented method of claim 3, wherein said restricting access via the computing device to one or more items in response to said determining comprises:
presenting, via the computing device and in response at least in part to said determining, the one or more items in one or more formats that prevent one or more editing actions from being performed on one or more parts of the one or more items.

44. The computationally-implemented method of claim 3, wherein said restricting access via the computing device to one or more items in response to said determining comprises:
presenting, via the computing device and in response at least in part to said determining, the one or more items in one or more formats that prevent at least one of one or more functionalities of the one or more items from being used.

45. The computationally-implemented method of claim 3, wherein said restricting access via the computing device to one or more items in response to said determining comprises:
restricting access via the computing device to one or more items in response to said determining by restricting access via the computing device to one or more items that were determined to be opened for access by the first user via the computing device.

46. The computationally-implemented method of claim 3, wherein said restricting access via the computing device to one or more items in response to said determining comprises:
restricting access via the computing device to one or more items that are ascertained to be affiliated with one or more particular entities in response to said determining.

47. The computationally-implemented method of claim 3, further comprising:
generating an alert that indicates that the computing device has been reconfigured to restrict access to the one or more items in response to said determining.

48. The computationally-implemented method of claim 3, wherein said determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner comprises:
detecting one or more gestures exhibited by the first user that at least rotate the computing device to cause a front side of the computing device to face away from the first user and toward the second user.

49. A computationally-implemented method, comprising:
determining that a computing device used by a first user has been transferred from the first user to a second user at least in part by the first user exhibiting one or more gestures with the computing device to at least one of hand or pass the device to the second user, the determining based at least in part on a detection that the computing device has moved in a particular manner, including at least:
determining that the first user has exhibited one or more arm and hand gestures that
include at least the first user holding the computing device in a hand and extending the hand, with the computing device, away from the first user; and
restricting access via the computing device to one or more items in response to said determining; and
wherein at least one of the determining that a computing device used by a first user has been transferred from the first user to a second user or the restricting access is performed at least in part with one or more processing devices.

* * * * *